United States Patent
Yasuda et al.

(10) Patent No.: US 10,314,084 B2
(45) Date of Patent: Jun. 4, 2019

(54) COMMUNICATION TERMINAL

(71) Applicant: NEC Corporation, Tokyo (JP)

(72) Inventors: Masato Yasuda, Tokyo (JP); Norihito Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/903,090

(22) PCT Filed: Jun. 20, 2014

(86) PCT No.: PCT/JP2014/003318
§ 371 (c)(1),
(2) Date: Jan. 6, 2016

(87) PCT Pub. No.: WO2015/004859
PCT Pub. Date: Jan. 15, 2015

(65) Prior Publication Data
US 2016/0192421 A1   Jun. 30, 2016

(30) Foreign Application Priority Data
Jul. 9, 2013 (JP) .................... 2013-143765

(51) Int. Cl.
H04W 76/23 (2018.01)
H04W 76/00 (2018.01)
(Continued)

(52) U.S. Cl.
CPC ......... *H04W 76/023* (2013.01); *H04W 76/14* (2018.02); *H04W 84/20* (2013.01); *H04W 8/005* (2013.01)

(58) Field of Classification Search
CPC ..... H04W 76/023; H04W 4/08; H04W 8/005; H04W 72/0446; H04W 72/0413;
(Continued)

(56) References Cited

U.S. PATENT DOCUMENTS 9,100,801 B2 * 8/2015 Jung .................. H04W 4/08
9,307,574 B2 * 4/2016 Nogawa ............. H04W 84/12
(Continued)

FOREIGN PATENT DOCUMENTS

JP  2004-104774 A  4/2004
JP  2013-038724 A  2/2013
(Continued)

OTHER PUBLICATIONS

International Search Report, Corresponding to PCT/JP2014/003318, dated Sep. 16, 2014, 1 page.
(Continued)

*Primary Examiner* — Khawar Iqbal
(74) *Attorney, Agent, or Firm* — Wilmer Cutler Pickering Hale and Dorr LLP

(57) ABSTRACT

A first communication terminal, unconnected with a communication network, searches for a second communication terminal existing around the own communication terminal. In the communication network, one of a plurality of communication terminals functions as a master having a function of an access point, and the rest of the communication terminals function as slaves of the master. Based on the information included in a communication message received from one or more second communication terminals found through the search, the first communication terminal determines a second communication terminal which serves as a connection counterpart from among the second communication terminals, and configures a communication network with the determined connection counterpart.

12 Claims, 20 Drawing Sheets

(51) Int. Cl.
*H04W 8/00* (2009.01)
*H04W 76/02* (2009.01)
*H04W 84/20* (2009.01)
*H04W 76/14* (2018.01)

(58) Field of Classification Search
CPC ..... H04W 72/042; H04W 4/22; H04W 72/10;
H04W 4/005; H04W 92/18; H04W 84/20;
H04W 76/02; H04W 8/00; H04W 76/068;
H04W 84/12; H04B 7/024
USPC .......................................... 455/434, 525, 41
See application file for complete search history.

(56) References Cited

U.S. PATENT DOCUMENTS

| | | | |
|---|---|---|---|
| 2004/0266404 A1 | 12/2004 | Nasu et al. | |
| 2011/0201363 A1* | 8/2011 | Shim | H04L 67/30 455/466 |
| 2012/0134349 A1 | 5/2012 | Jung et al. | |
| 2013/0039358 A1 | 2/2013 | Ejima | |
| 2013/0227084 A1* | 8/2013 | Kim | H04L 65/60 709/219 |
| 2013/0242805 A1* | 9/2013 | Jung | H04W 4/08 370/255 |
| 2014/0071870 A1* | 3/2014 | Abraham | H04W 52/0206 370/311 |
| 2014/0094209 A1* | 4/2014 | Ren | H04W 60/00 455/515 |
| 2014/0160978 A1* | 6/2014 | Palin | H04W 8/005 370/254 |
| 2014/0208071 A1* | 7/2014 | Jeong | G06F 15/80 712/31 |
| 2014/0323060 A1* | 10/2014 | Shimazaki | H04W 48/20 455/73 |
| 2014/0370837 A1* | 12/2014 | Gladstone | H04W 4/008 455/404.1 |
| 2015/0133049 A1* | 5/2015 | Lee | H04B 5/0031 455/41.1 |
| 2015/0334538 A1* | 11/2015 | Jung | H04W 4/08 455/518 |
| 2015/0358403 A1* | 12/2015 | Bodstrom | H04W 84/20 709/209 |
| 2015/0358981 A1* | 12/2015 | Chae | H04W 76/023 370/252 |
| 2015/0359023 A1* | 12/2015 | Stojanovski | H04W 74/02 370/329 |
| 2016/0066353 A1* | 3/2016 | Kumar | H04W 12/06 709/227 |
| 2016/0360065 A1* | 12/2016 | Shimazaki | G06F 3/1292 |
| 2016/0360565 A1* | 12/2016 | Li | H04W 76/14 |
| 2016/0366718 A1* | 12/2016 | Sadeghi | H04W 76/14 |
| 2018/0048515 A1* | 2/2018 | Saito | H04L 29/12009 |

FOREIGN PATENT DOCUMENTS

| | | |
|---|---|---|
| JP | 2013-507029 A | 2/2013 |
| JP | 2013-074579 A | 4/2013 |
| WO | WO-2004/019566 A2 | 3/2004 |

OTHER PUBLICATIONS

Wi-Fi Alliance Technical Committee P2P Task Group Wi-Fi Peer-to-Peer (P2P) Technical Specification, Version 1.1, 2010, 159 pp.
Japanese Office Action issued by the Japan Patent Office for Japanese Application No. 2015-526147 dated Jul. 3, 2018 (6 pages).

\* cited by examiner

COMMUNICATION TERMINAL

CROSS-REFERENCE TO RELATED APPLICATIONS

The present application is a national stage application of International Application No. PCT/JP2014/003318 entitled "Communication Terminal," filed on Jun. 20, 2014, which claims the benefit of priority from Japanese Patent Application No. 2013-143765, filed on Jul. 9, 2013, the disclosures of which are incorporated herein in their entirety by reference thereto.

TECHNICAL FIELD

The present invention relates to a communication terminal, a network configuration method, and a program.

BACKGROUND ART

As a type of short-distance communication network, a communication network conforming to the Wi-Fi Direct specification has been known (see Non-Patent Document 1, for example). In the communication network conforming to the Wi-Fi Direct specification, one of a plurality of communication terminals participating in a network functions as a master having an access point function, and the rest of the communication terminals function as slaves of the master. Compared with a Wi-Fi Ad-hoc network in which only one-to-one connection is available, a communication network conforming to the Wi-Fi Direct specification has features that one-to-many connection is available, communication between slaves can be established via the master, security strength is relatively high, and the like. As such, a communication network conforming to the Wi-Fi Direct specification has been used in various applications such as data sharing, recently. The present invention relates to a method of configuring such a communication network conforming to the Wi-Fi Direct specification. However, application of the present invention is not limited to a communication network conforming to the Wi-Fi Direct specification.

Patent Document 1 describes an exemplary method of configuring a communication network conforming to the Wi-Fi Direct specification. In Patent Document 1, in order to exchange P2P(Peer to Peer) capability information, each communication terminal is able to exchange information with another communication terminal to request establishment of a P2P connection, without user intervention. When exchanging the P2P capability information, parameter information showing a connection type (Wi-Fi Direct, or the like), a protocol, corresponding authentication, a security method, or the like is exchanged. Then, based on the found P2P type or the like, each communication terminal determines whether or not to establish a P2P connection with another communication terminal. For example, a communication terminal requests a connection with another communication terminal via the network connection type of Wi-Fi Direct, in order to use a VoIP service. In the process, the case of establishing a P2P connection between only two communication terminals and the case of establishing a P2P connection among two or more communication terminals are exemplary shown.

Patent Document 1: JP 2013-507029 A

Non-Patent Document 1: Wi-Fi Alliance Technical Committee P2P Task Group Wi-Fi Peer-to-Peer (P2P) Technical Specification Version 1.1

SUMMARY

Meanwhile, Non-Patent Document 1 provides a procedure of searching for a nearby communication terminal by a communication terminal unconnected with a communication network, by transmitting and receiving a communication message regarding the search with another communication terminal. However, neither Non-Patent Document 1 nor Patent Document 1 describes a method of determining a connection counterpart when one or more communication terminals are found in the search. With a method in which information regarding the found communication terminals is presented to a user of a communication terminal and the user is allowed to select one communication terminal, it is difficult to realize an automatic connection.

An object of the present invention is to provide a network configuration method which solves the above described problem, that is, a problem that it is difficult to automatically connect a communication terminal, unconnected with a communication network, to another communication terminal.

A network configuration method, according to a first exemplary aspect of the present invention, is a method of configuring a communication network in which one of a plurality of communication terminals functions as a master having a function of an access point and the rest of the communication terminals function as slaves of the master. The method includes:

by a first communication terminal unconnected with the communication network, searching for a second communication terminal existing around the own communication terminal, by the first communication terminal, based on the information included in a communication message received from the one or more second communication terminals found through the search, determining one of the second communication terminals that serves as a connection counterpart, from among the one or more second communication terminals, configuring the communication network with the determined connection counterpart.

A communication terminal, according to a second exemplary aspect of the present invention, is a communication terminal that constitutes a communication network in which one communication terminal of the communication terminals functions as a master having a function of an access point, and the rest of the communication terminals function as slaves of the master. The communication terminal includes:

a wireless communication unit that performs transmission and reception of a communication message with another communication terminal; and a control unit connected with the wireless communication unit.

The control unit searches for another communication terminal existing around the own communication terminal.

Based on the information included in a communication message received from the one or more other communication terminals found through the search, the control unit determines one of the other communication terminals that serves as a connection counterpart, from among the one or more other communication terminals, and the control unit configures the communication network with the determined connection counterpart.

A network configuration method, according to a third exemplary aspect of the present invention, is a network configuration method performed by a communication terminal that constitutes a communication network in which one communication terminal of the communication terminals functions as a master having a function of an access point, and the rest of the communication terminals function as slaves of the master. The method includes:

searching for another communication terminal existing around the own communication terminal, based on the information included in a communication message received from the one or more other communication terminals found through the search, determining one of the other communication terminals that serves as a connection counterpart, from among the one or more other communication terminals, and configuring the communication network with the determined connection counterpart.

A program, according to a fourth exemplary aspect of the present invention, causes a computer held by a communication terminal to function as, the communication terminal constituting a communication network in which one communication terminal of the communication terminals functions as a master having a function of an access point, and the rest of the communication terminals function as a slave of the master:

a wireless communication unit that transmits and receives a communication message with another communication terminal; and a control unit connected with the wireless communication unit.

The control unit searches for another communication terminal existing around the own communication terminal.

Based on information included in a communication message received from the one or more other communication terminals found through the search, the control unit determines one of the other communication terminals that serves as a connection counterpart, from among the one or more other communication terminals, and the control unit configures the communication network with the determined connection counterpart.

As the present invention has the configurations described above, it is possible to automatically connect a communication terminal, unconnected with a communication network, to another communication terminal.

EXEMPLARY EMBODIMENTS

Next, exemplary embodiments of the present invention will be described with reference to the drawings.

First Exemplary Embodiment

Figure 1:
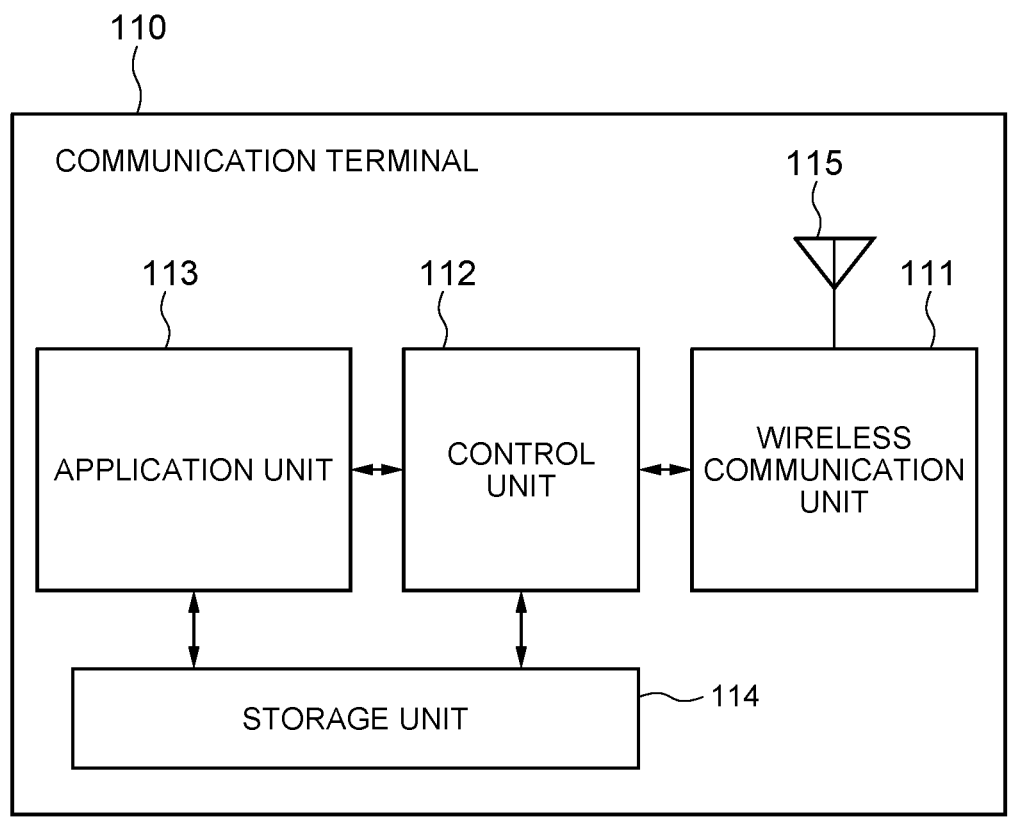
FIG. 1 is a block diagram of a communication terminal according to a first exemplary embodiment of the present invention.

Referring to FIG. 1, a communication terminal 110 according to a first exemplary embodiment of the present invention is a wireless communication terminal which forms a communication network conforming to the Wi-Fi Direct specification. The communication terminal 110 includes a wireless communication unit 111, a control unit 112, an application unit 113, a storage unit 114, and an antenna 115.

The wireless communication unit 111 has a function of transmitting and receiving communication messages wirelessly with another communication terminal. At the time of transmission, the wireless communication unit 111 creates a packet of a communication message in response to a request from the control unit 112, performs processing such as addition of a header and an error detection code to the created packet, generates a modulation signal of a frequency band of a carrier wave from the processed data, and transmits it as a radio signal from the antenna 115. Further, at the time of reception, the wireless communication unit 111 demodulates a radio signal received by the antenna 115 to thereby decode the packet of a communication message, and notifies the control unit 112 of the communication message after checking that there is no error based on the error detection code.

The control unit 112 has a function of governing overall control of the communication terminal 110 including determination of a frequency to be used by the wireless communication unit 111, creation and transmission instruction of various types of communication messages, interpretation of received various types of communication messages, and control of connection processing.

For example, the control unit 112 has a function of searching for another communication terminal existing around the own communication terminal through transmission and reception of communication messages regarding a search via the wireless communication unit 111 with another communication terminal existing around the own communication terminal, if the own communication terminal is unconnected with a communication network. The search for a nearby communication terminal is performed conforming to Device Discovery Procedure of the Wi-Fi Direct specification, for example.

Specifically, the control unit 112 transmits a prove request to the surroundings, and wait for reception of a prove response. Then, when the control unit 112 receives a prove response, the control unit 112 recognizes that there is another communication terminal around the own communication terminal. Further, by analyzing the received prove response, the control unit 112 recognizes a communication address (MAC address, for example), a connection state to a network, propriety of the master, and the like of such a communication terminal existing around it.

According to the Wi-Fi Direct specification, a prove response includes a MAC address of a communication terminal which transmitted the prove response. Further, according to the Wi-Fi Direct specification, the prove response has attributes such as P2P Capability, P2P Device Info, and P2P Group Info. P2P Capability has fields such as Group Capability Bitmap. Group Capability Bitmap has bits such as P2P Group Owner, Persistent P2P Group, and Persistent Reconnect. If the other communication terminal is GO, the P2P Group Owner bit is set to 1. If the other communication terminal hosts a persistent group (Persistent P2P Group) or in a state of being capable of hosting it (hereinafter, such a state is described as a state of being capable of hosting a persistent group), the Persistent P2P Group bit and the Persistent Reconnect bit are set to 1. Here, a persistent group is a group in which credentials used at the time of constructing the group are stored so as to be reusable in subsequent group construction, the details of which are described in Non-Patent Document 1.

Further, P2P Device Info has a field such as P2P Device Address and Config Methods. P2P Device Address is an identifier which uniquely identifies the other communication terminal. Config Methods describe information (authentication method such as PIN or PBC, for example) regarding WSC (Wi-Fi Simple Configuration) Methods supported by the other communication terminal. On the other hand, P2P Group Info is only included in a prove response returned from GO, and has a field such as P2P Client Info Descriptor. P2P Client Info Descriptor includes information regarding the client belonging to the GO group.

Further, the control unit 112 has a function of determining another communication terminal which becomes a connection counterpart from among the other communication terminals based on the information included in the communication messages received from the other communication terminals found through the search, and configuring a communication network with the connection counterpart. An exemplary method of determining a connection counterpart by the control unit 112, based on the information included in the communication message received from another communication terminal, will be described below.

(1) Connection Counterpart Determination Method 1

The communication terminal 110 stores a list of communication addresses (MAC addresses, for example) of communication terminals in the storage unit 114. From the communication message received from another communication terminal found through the search, the control unit 112 acquires the communication address of the communication terminal. Then, the control unit 112 checks the acquired communication address with the communication address in the list, and determines whether or not the received communication address is on the list. The control unit 112 determines a communication terminal in which the communication address thereof is one the list, among the one or more communication terminals found, to be a connection counterpart. According to this determination method, it is possible to automatically connect a communication terminal, unconnected with the communication network, to another communication terminal listed in advance.

(2) Connection Counterpart Determination Method 2

The communication terminal 110 stores states of a communication terminal and priorities among the states, in the storage unit 114. Here, the states of a communication terminal include a state showing whether or not to be connected with a network, a state showing whether or not to be functioning as a master, a state of being capable of hosting a persistent group, and the like. From the communication message received from another communication terminal found through the search, the control unit 112 acquires a state of the other communication terminal. For example, if there is no P2P Group Info attribute in the received Probe Response, the control unit 112 determines that the communication terminal which transmitted the Probe Response is in a non-connected state. Further, the control unit 112 acquires a state whether or not the communication terminal is GO, from the P2P Group Owner bit in the Group Capability Bitmap field in the P2P Capability attribute, for example. Further, the control unit 112 acquires whether or not the communication terminal is in a state of being capable of hosting a persistent group, from the Persistent P2P Group bit or the Persistent Reconnect bit in the Group Capability Bitmap field in the P2P Capability attribute, for example.

Then, the control unit 112 determines a communication terminal in a state of a higher priority, to be a connection counterpart.

According to this determination method, by setting a state of being connected with a network and being functioning as a master to have a higher priority than a state of being unconnected with the network, it is possible to automatically connect a communication terminal, unconnected with a communication network, to another communication terminal which is connected with the network and is functioning as a master. On the contrary, by setting a state of being unconnected with a network to have a higher priority than a state of being functioning as a master, it is possible to automatically connect a communication terminal, being unconnected with a communication network, to another communication terminal unconnected with the communication network. Further, by setting a state of being capable of hosting a persistent group to have a higher priority than a state of being incapable of hosting a persistent group, a high-speed connection can be realized.

The method of determining a connection counterpart based on the information included in a communication message is not limited to the determination method 1 and the determination method 2. A method in which the determination method 1 and the determination method 2 are combined, or another method, may be adopted.

The application unit 113 has a function of executing an application program. Any types and any number of application programs may be used. For example, in the application unit 113, an application for making voice communication, an application for performing file transfer, an application for exchanging content data, and the like, with another communication terminal connected with the communication network, may be executed.

The storage unit 114 is configured of storage devices such as a ROM (Read Only Memory), a RAM (Random Access Memory), and a hard disk, and stores programs and various types of data. Data to be stored includes control data and application data. Control data includes own communication terminal status information representing whether or not the own communication terminal 110 is connected with a communication network, information of the master when the own communication terminal 110 is connected with a communication network, information received from another communication terminal searched (communication address, terminal name, and status information of the communication terminal, the status information being another communication terminal status information representing unconnected terminal not connected with a communication network, a master terminal having being connected, or whether or not in a state of being capable of hosting a persistent group). Application data includes content data shared by the application unit 113 and another communication terminal. Programs to be stored include an application program executed by the application unit 113.

Next, operation of the communication terminal 110 according to the present embodiment will be described.

Figure 2:
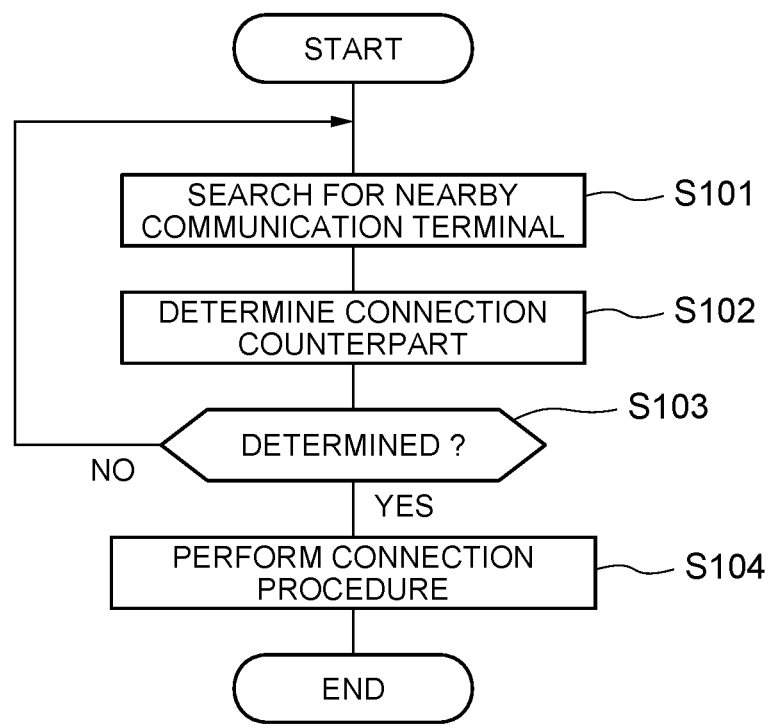
FIG. 2 is a flowchart showing operation of the communication terminal according to the first exemplary embodiment of the present invention.

When the control unit 112 of the communication terminal 110 is activated, the control unit 112 begins execution of the processing shown in FIG. 2. First, the control unit 112 searches for a nearby communication terminal by exchanging communication messages regarding the search with another communication terminal existing around the own communication terminal via the wireless communication unit 111 (step S101). The search for a nearby communication terminal is performed in conformity with a device discovery procedure of the Wi-Fi Direct specification, for example. When the control unit 112 finds one or more communication terminals, the control unit 112 proceeds to the processing of step S102. Meanwhile, if the control unit 112 fails to find any communication terminal, the control unit 112 stays at step S101 and continues processing to search for a nearby communication terminal.

Next, at step S102, the control unit 112 of the communication terminal 110 determines a connection counterpart from among the one or more communication terminals found through the search. Specifically, based on the information included in the communication messages received from the one or more communication terminals found through the search, the control unit 112 determines one communication terminal to be a connection counterpart from among the one or more communication terminals. Then, when a communication terminal to be a connection counterpart is determined (YES at step S103), the control unit 112 proceeds to the processing of step S104. Meanwhile, if a communication terminal to be a connection counterpart is not determined (NO at step S103), the control unit 112 returns to step S101 and continues processing to search for a nearby communication terminal.

Next, at step S104, the control unit 112 of the communication terminal 110 establishes a communication network by exchanging communication messages via the wireless communication unit 111 with the communication terminal determined to be a connection counterpart. Then, the communication terminal 110 begins transmission and reception of application data with the other communication terminal connected to the communication network, by the application unit 113.

As described above, according to the present embodiment, it is possible to automatically connect communication terminal 110, unconnected with the communication network, to another communication terminal. This is because the communication terminal 110 determines a communication terminal to be a connection counterpart from among one or more communication terminals, based on the information included in the communication messages received from the one or more communication terminals found through a search, and establishes a network with the determined connection counterpart.

Second Exemplary Embodiment

Figure 3:
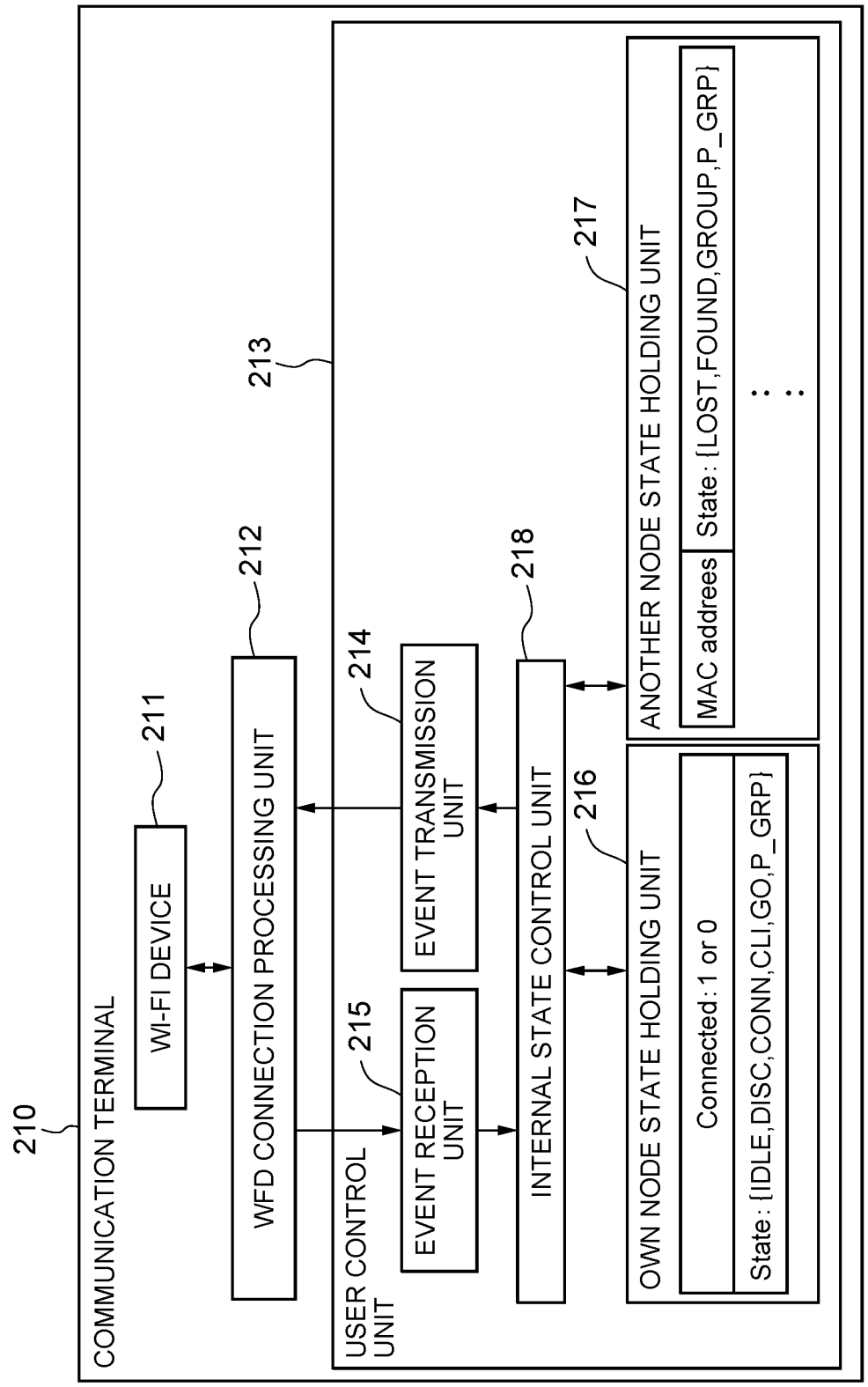
FIG. 3 is a block diagram of a communication terminal according to a second exemplary embodiment of the present invention.

The present embodiment mainly describes details of the software configuration of a communication terminal according to the present invention. Referring to FIG. 3, a communication terminal (node) 210 according to a second exemplary embodiment of the present invention includes a Wi-Fi device 211, a WFD connection processing unit 212, and a user control unit 213. Compared with FIG. 1, the Wi-Fi device 211 corresponds to the wireless communication unit 111, and the WFD connection processing unit 212 and the user control unit 213 correspond to the control unit 112 and the storage unit 114. It should be noted that the Wi-Fi device 211 is installed in hardware of a wireless LAN not shown. Further, the WFD connection processing unit 212 and the user control unit 213 are installed in MPU not shown.

The Wi-Fi device 211 is a device driver of a wireless LAN.

The WFD connection processing unit 212 is a block which generates and receives a packet of Wi-Fi Direct. The WFD connection processing unit 212 performs control of a Wi-Fi device for Wi-Fi Direct connection. The control is performed in units of "Device Discovery", "Group Formation", "WPS (Wi-Fi Protected Setup) Provisioning Phase 1", "WPS Provisioning Phase 2", and the like. The WFD connection processing unit 212 receives an event from the user control unit 213 and begins control, and notifies the user control unit 213 of the result as an event.

The user control unit 213 is a block which realizes an automatic connection by Wi-Fi Direct. The user control unit 213 includes an event transmission unit 214 and an event reception unit 215 which connect with the WFD connection processing unit 212 and transmit and receive information, an own node state holding unit 216 which holds a state of the own node, an another node state holding unit 217 which holds a list of MAC address and a state of another node, and an internal state control unit 218.

In the own node state holding unit 216, as a state of the own node, any one of IDLE (no connection), DISC (node found), CONN (in connection), CLI (in connection as a client), and GO (in connection as a group owner), and P_GRP (information showing a state of being capable of hosting a persistent group) are stored. The information showing a state of being capable of hosting a persistent group includes 1 or 0, and an identifier which uniquely identifies a persistent group. In this example, 1 represents a state of being capable of hosting a persistent group, and 0 represents a state of being incapable of hosting it.

In the another node state holding unit 217, as a state of another node, any one of LOST (unconnected), FOUND (in connection as a client), and GROUP (in connection as a group owner), and P_GRP (information showing a state of being capable of hosting a persistent group) are stored.

The internal state control unit 218 selects and generates an appropriate command based on the event type received from the WFD connection processing unit 212 via the event reception unit 215, the state of the own node stored in the own node state holding unit 216, and the state of another node stored in the another node state holding unit 217, to thereby constitute a group between adjacent Wi-Fi Direct enabled nodes.

Figure 4:
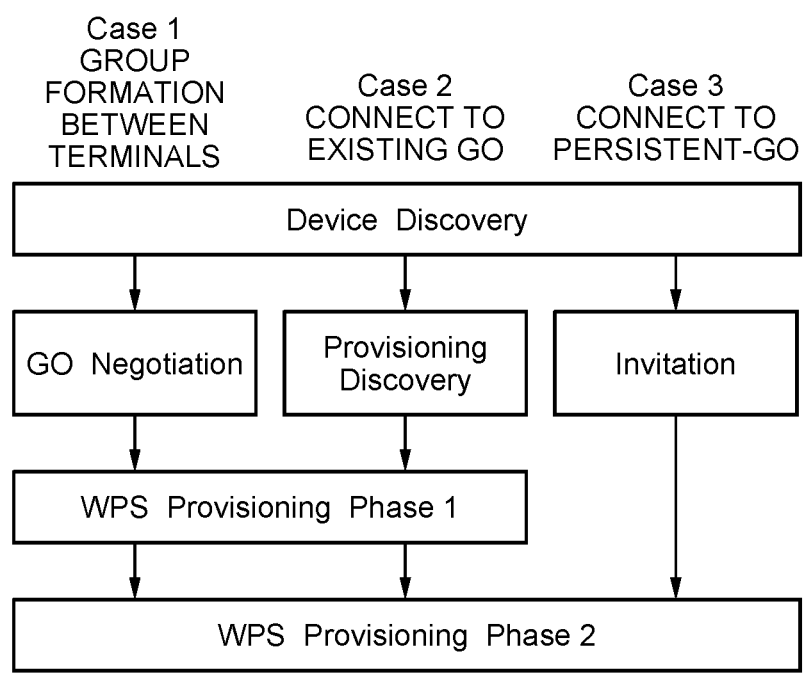
FIG. 4 is a flowchart showing the outline of a procedure of connecting a communication terminal, according to the second exemplary embodiment of the present invention, to another communication terminal.

FIG. 4 shows the outline of a procedure of connecting the communication terminal 210 to another communication terminal. First, the communication terminal 210 searches for another node by "Device Discovery" and determines a connection counterpart. The subsequent procedure differs depending on the types of the states of the communication terminal 210 and the determined connection counterpart.

If the other node which is the connection counterpart is an unconnected node like the own node, and it does not belong to the same persistent group as that of the own communication terminal 210, or although it belongs to the same persistent group, the own communication terminal 210 or the other node is a node incapable of hosting the persistent group, "GO Negotiation", "WPS Provisioning Phase 1", and "WPS Provisioning Phase 2" are performed in this order (Case 1 in FIG. 4).

If the other node determined to be a connection counterpart is GO and it does not belong to the same persistent group as that of the own communication terminal 210, or although it belongs to the same persistent group, the own communication terminal 210 or the other node is incapable of hosting the persistent group, "Provisioning Discovery", "WPS Provisioning Phase 1", and "WPS Provisioning Phase 2" are performed in this order (Case2 in FIG. 4).

If the other node determined to be a connection counterpart belongs to the same persistent group as that of the communication terminal 210 and the own communication terminal 210 or the other node is capable of hosting the persistent group, "Invitation" and "WPS Provisioning Phase 2" are performed in this order (Case 3 in FIG. 4).

Figure 5:
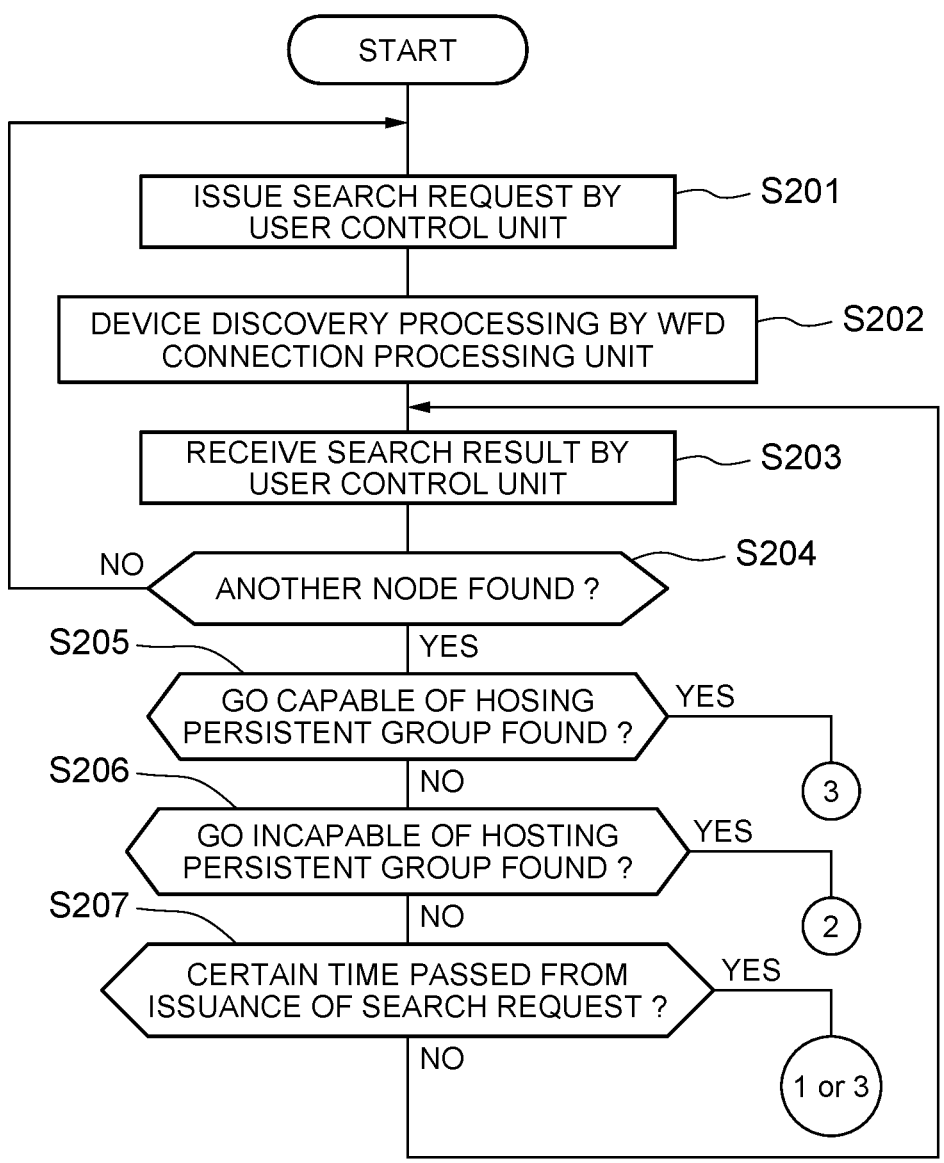
FIG. 5 is a flowchart showing details of Device Discovery performed by a communication terminal in the second exemplary embodiment of the present invention.

FIG. 5 is a flowchart showing the details of the Device Discovery procedure. First, the user control unit 213 of the communication terminal 210 issues a search request to the WFD connection processing unit 212 (step S201). In accordance with the search request, the WFD connection processing unit 212 performs Device Discovery processing (step S202).

Figure 6:
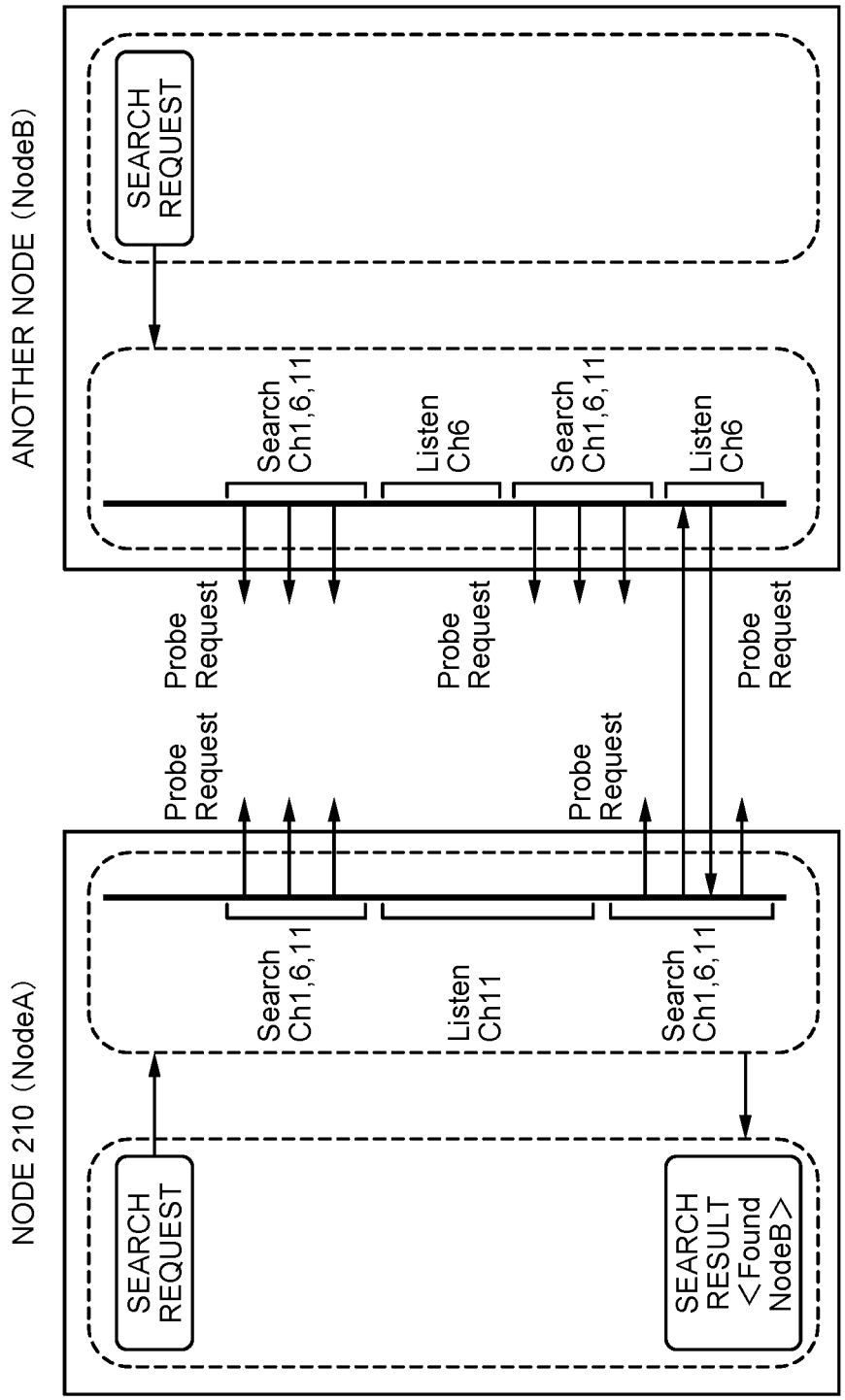
FIG. 6 is a diagram showing the outline of Device Discovery operation performed by a communication terminal, according to the second exemplary embodiment of the present invention, with another communication terminal.

FIG. 6 shows the outline of the Device Discovery processing. The WFD connection processing unit 212 of the communication terminal 210 receives a search request from the user control unit 213 and searches for an adjacent node. During Discovery, the Search state and the Listen state are alternately switched from each other. In the Search state, the channels are sequentially switched among 1, 6, and 11 to thereby transmit Probe Request, and Probe Response returned from an adjacent node is waited for. In the Listen state, Probe Request from another node is waited for, and upon receipt of Probe Request, Probe Response is returned. Upon receipt of the Probe Response from the adjacent node, information of the adjacent node, included in the Probe Response, is returned as a search result. If no Probe Request is received from an adjacent node after a certain period of time (30 seconds, for example) has elapsed, a search result describing that no adjacent node was found is returned.

Figure 7:
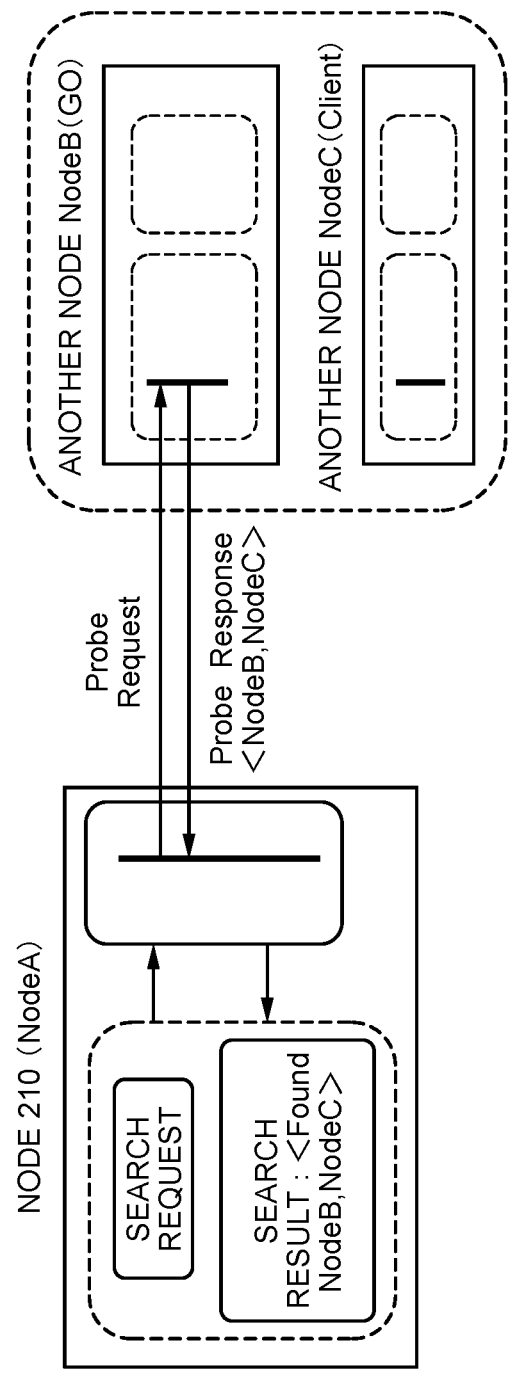
FIG. 7 is a diagram showing the outline of Device Discovery operation performed by a communication terminal, according to the second exemplary embodiment of the present invention, with another communication terminal with which a group has been established.

FIG. 7 shows the outline of the Device Discovery processing to be performed on a constructed group. If there is a constructed group around the communication terminal 210, GO of the constructed group returns Probe Response with respect to the Probe Request transmitted by the communication terminal 210. In the Probe Response returned by the GO, P2P GROUP Info attribute exists, in which a list of clients belonging to the group is included.

Figure 8:
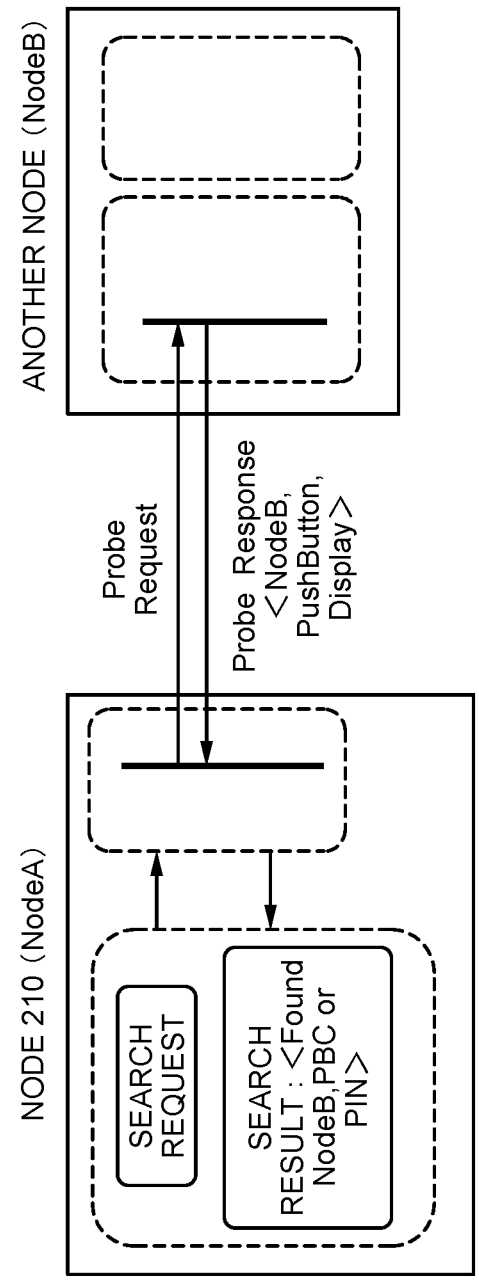
FIG. 8 is a schematic diagram showing the case of that a communication terminal according to the second exemplary embodiment of the present invention acquires, from Probe Response received from another communication terminal, an authentication method supported by the other communication terminal.

Further, as shown in FIG. 8, Probe Request includes WSC Config Methods describing information regarding the authentication method supported by the adjacent node. There are two types of authentication methods namely PIN (Personal Identification Number) and PBC (Push Button Control). The communication terminal 210 which performed Device Discovery selects an authentication method to be used from a list of authentication information notified from the adjacent node by the Probe Response, and establishes a connection. In the case of selecting PIN, in the present embodiment, automation is realized by using a PIN number set by a user beforehand.

When the user control unit 213 of the communication terminal 210 receives a search result from the WFD connection processing unit 212 (step S203 in FIG. 5), the user control unit 213 analyzes the search result and determines whether or not another node is found (step S204). If another node is not found, the user control unit 213 issues a search request again to the WFD connection control unit 212 (step S201). The loop of steps S201 to S204 is repeated until another node is found.

On the other hand, when another node is found, the user control unit 213 of the communication terminal 210 analyzes the information of the adjacent node included in the search result, and determines whether or not GO capable of hosting a persistent group is found (step S205). In this example, GO capable of hosting a persistent group means another communication terminal which belongs to the same persistent group as that of the own communication terminal and is capable of hosting the persistent group, is connected with a communication network, and functions as a master. In the case where it is found, the user control unit 213 proceeds to processing to connect to the found GO capable of hosting the persistent group. Meanwhile, in the case where GO capable of hosting a persistent group is not found, the user control unit 213 determines whether or not GO incapable of hosting a persistent group is found (step S206). In this example, GO incapable of hosting a persistent group means another communication terminal which does not belong to the same persistent group as that of the own communication terminal, or which belongs to the same persistent group but is incapable of hosting the persistent group and is connected with a communication network and functions as a master. When GO incapable of hosting the persistent group is found, the user control unit 213 proceeds to processing to connect to the found GO incapable of hosting the persistent group. If GO capable of hosing a persistent group or GO incapable of hosting a persistent group is not found and an unconnected node is found, the user control unit 213 determines whether or not a certain period of time has passed from the issuance of the search request (step S207). If a certain period of time has not passed, as there is a possibility that the WFD connection processing unit 212 issues a search result showing that another node is found, the user control unit 213 returns to step S203 and waits for reception of a search result. Meanwhile, if a certain period of time has passed, the user control unit 213 proceeds to processing to connect to the unconnected node found. Connection is made preferentially to a node having a bit capable of hosting a persistent group, that is, a terminal belonging to the same persistent group as that of the own communication terminal and is in a state of being capable of hosting the persistent group, among the unconnected nodes found.

Figure 9:
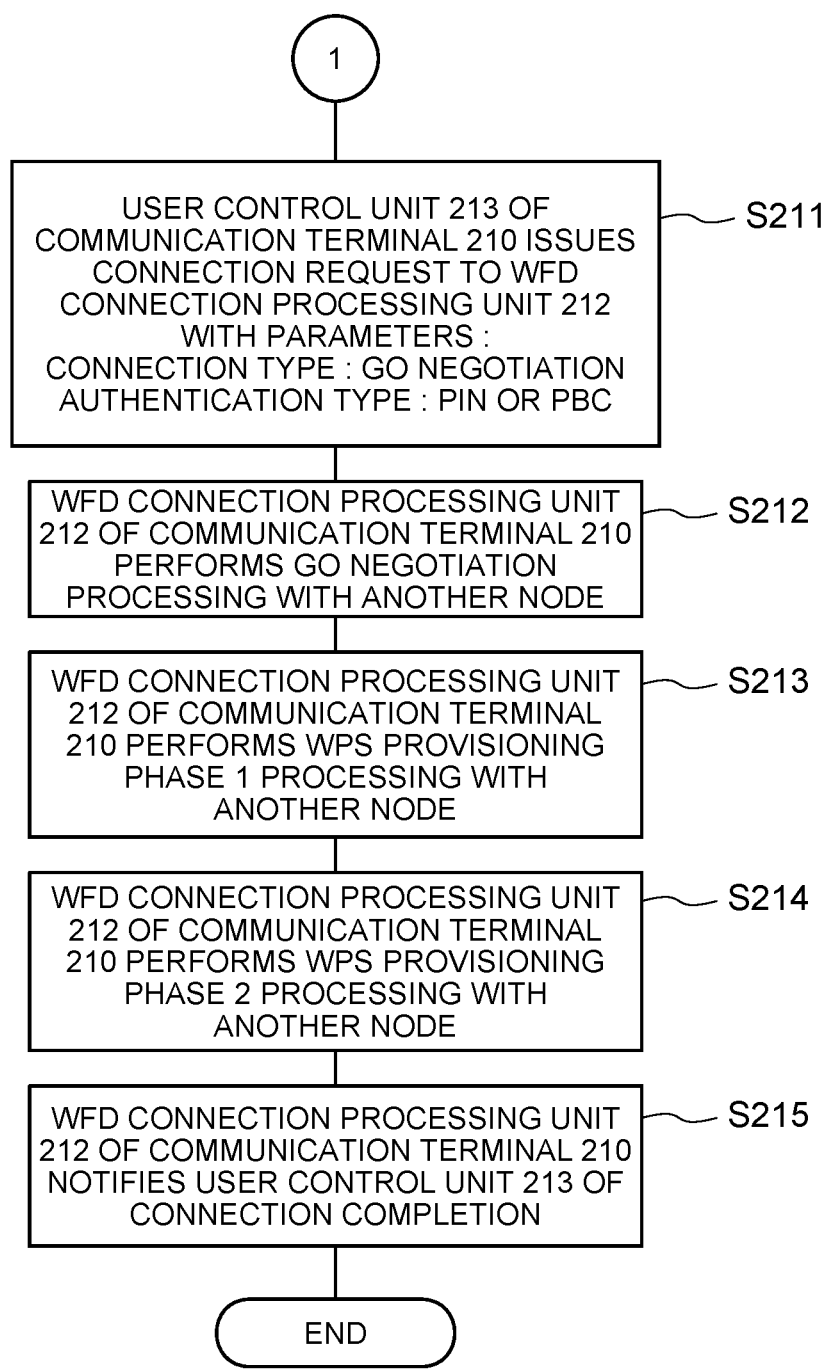
FIG. 9 is a flowchart showing an exemplary procedure of connecting a communication terminal, according to the second exemplary embodiment of the present invention, to another communication terminal.

FIG. 9 shows the outline of the processing by the communication terminal 210 until a group is formed with another node in an unconnected state. In this example, the communication terminal 210 and another node, which is a connection counterpart, do not belong to the same persistent group, or they belong to the same persistent group but the communication terminal 210 or the other node is not in a state of being capable of hosting the persistent group. First, the user control unit 213 of the communication terminal 210 issues a connection request to the WFD connection processing unit 212 with parameters of connection type: GO Negotiation and authentication type: PIN or PBC (step S211). When the WFD connection processing unit 212 of the communication terminal 210 receives the connection request, it performs GO Negotiation processing (step S212), WPS Provisioning Phase 1 processing (step S213), and WPS Provisioning Phase 2 processing (step S214) sequentially, with the other node. Then, upon completion of the series of processing, the WFD connection processing unit 212 issues a notification of connection completion to the user control unit 213 (step S215), and ends the processing of group formation between the terminal.

Figure 10:
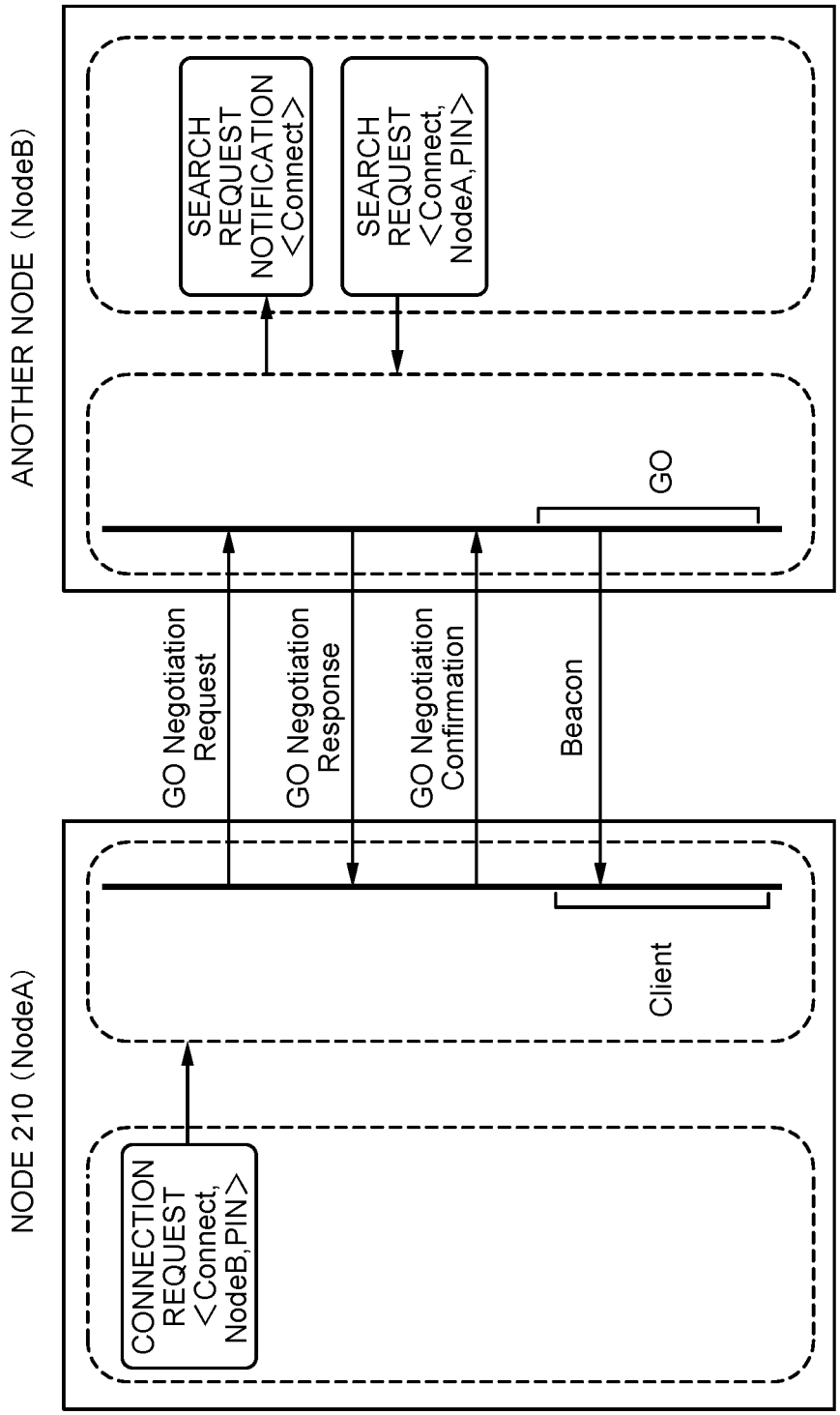
FIG. 10 is a diagram showing the outline of GO Negotiation performed by a communication terminal, according to the second exemplary embodiment of the present invention, with another communication terminal.

In the GO Negotiation processing at step S212, as shown in FIG. 10, GO Negotiation Request, GO Negotiation Response, and GO Negotiation Confirmation are transmitted and received between the communication terminal 210 and the other node which is a connection counterpart, whereby either one of the nodes is determined to be GO. In FIG. 10, the other node is determined to be GO, and the communication terminal 210 operates as a client. The node working as GO transmits Beacon periodically.

Figure 11:
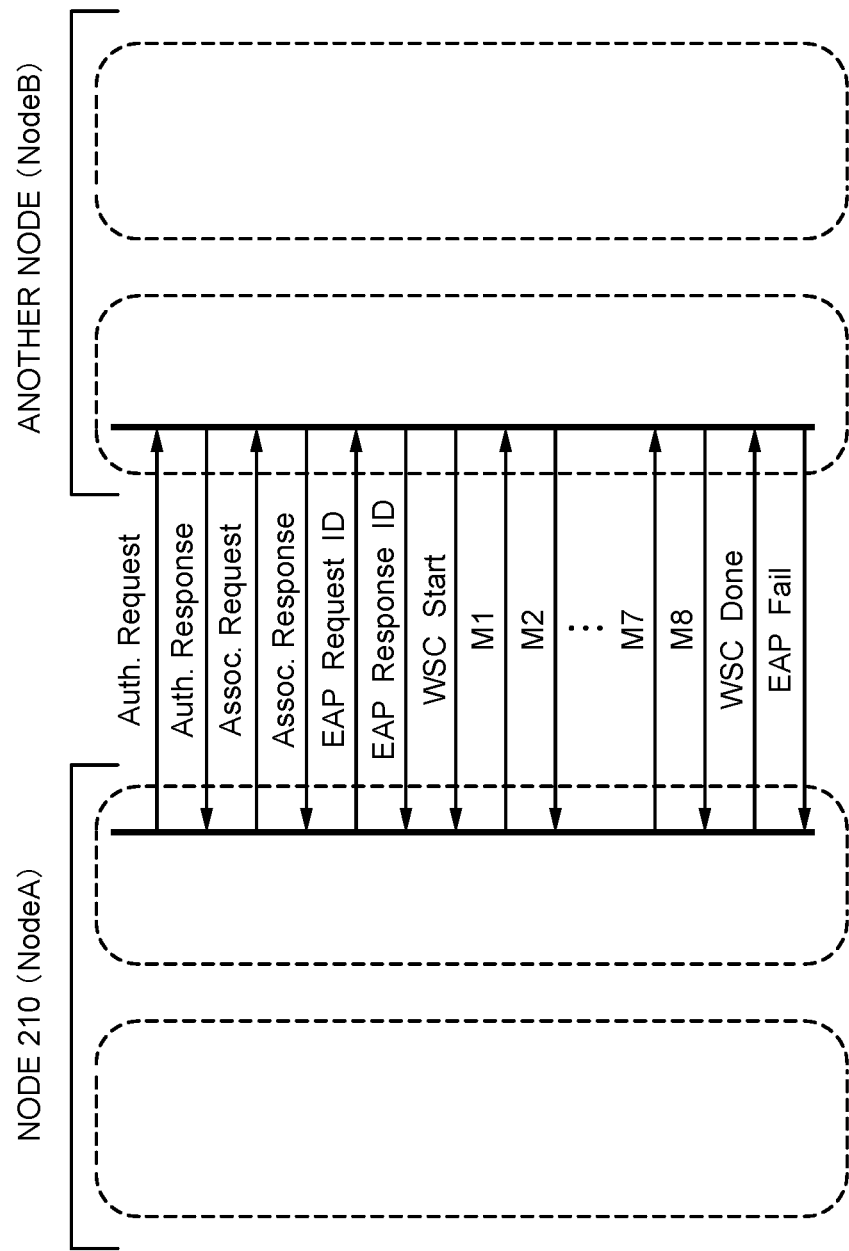
FIG. 11 is a diagram showing the outline of WPS Provisioning Phase 1 performed by a communication terminal, according to the second exemplary embodiment of the present invention, with another communication terminal.

In the WPS Provisioning Phase 1 processing at step S213, as shown in FIG. 11, Auth. Request, Auth. Response, Assoc. Request, Assoc. Response, EAP Request ID, EAP Response ID, WSC Start, M1-M8, WSC Done, and EAP Fail are transmitted and received between the communication terminal 210 and the other node which is a connection counterpart.

Figure 12:
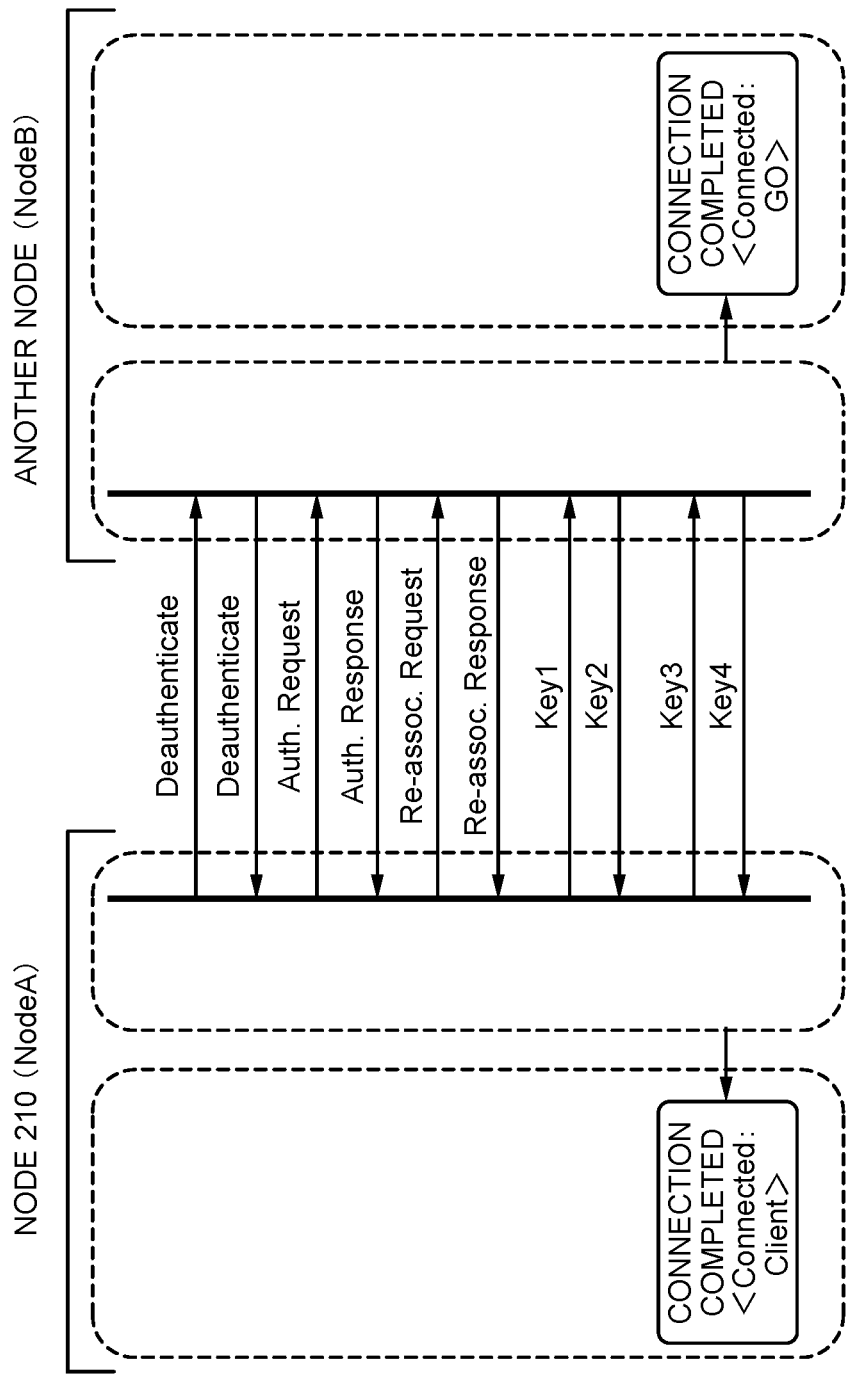
FIG. 12 is a diagram showing the outline of WPS Provisioning Phase 2 performed by a communication terminal, according to the second exemplary embodiment of the present invention, with another communication terminal.

In the WPS Provisioning Phase 2 processing at step S214, as shown in FIG. 12, Deauthenticate, Deauthenticate, Auth. Request, Auth. Response, Re-assoc. Request, Re-assoc. Response, and key1-key4 are transmitted and received between the communication terminal 210 and the other node which is a connection counterpart. Then, a connection completion is notified from the WFD connection processing unit 212 to the user control unit 213.

Figure 13:
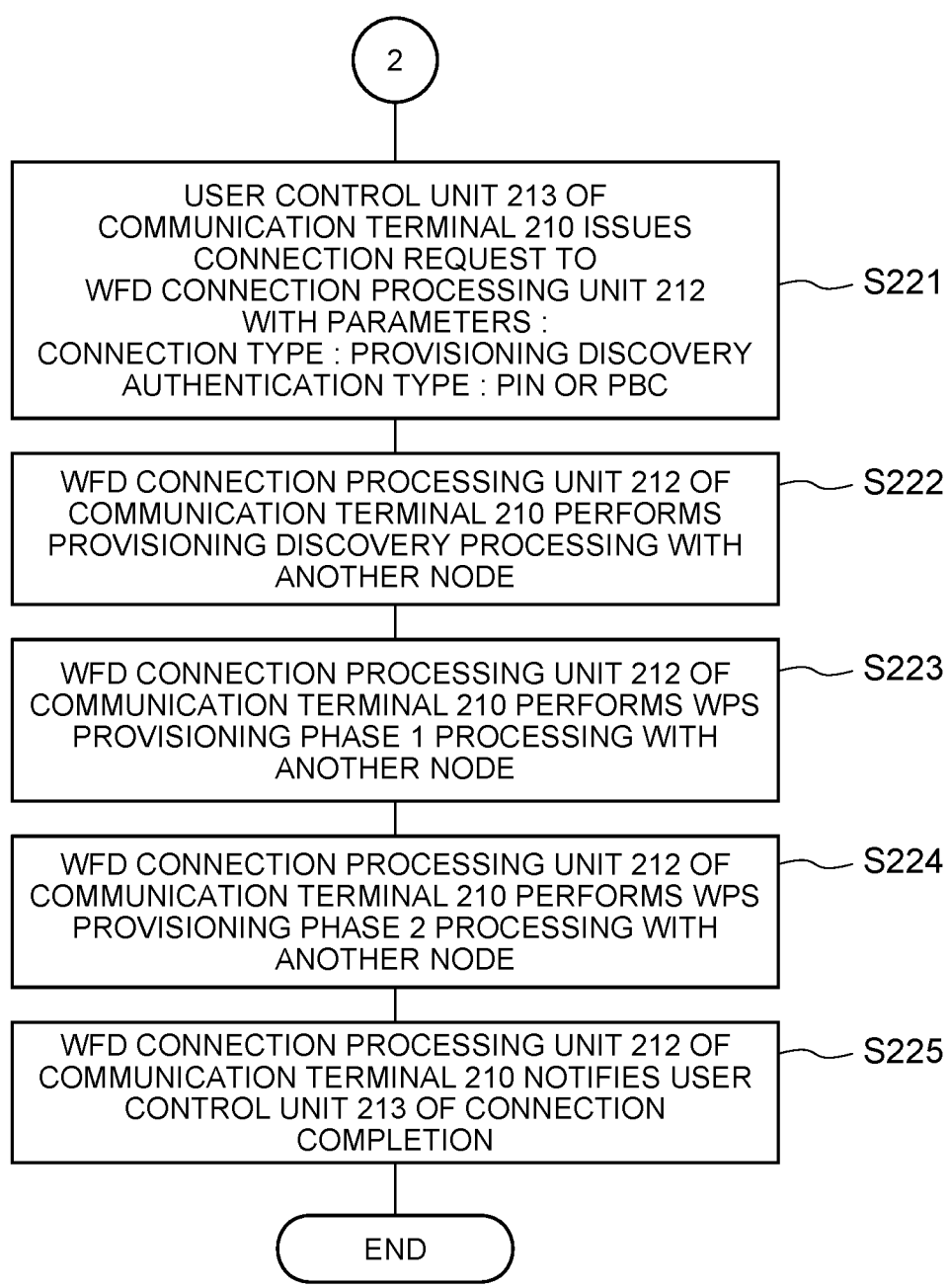
FIG. 13 is a flowchart showing another exemplary procedure of connecting a communication terminal, according to the second exemplary embodiment of the present invention, to another communication terminal.

FIG. 13 shows the outline of the processing performed until the communication terminal 210 connects to the existing GO. In this example, the communication terminal 210 and the other node which is a connection counterpart do not belong to the same persistent group, or even if they belong to the same persistent group, the other node is not in a state of being capable of hosting the persistent group. First, the user control unit 213 of the communication terminal 210 issues a connection request to the WFD connection processing unit 212 with parameters of connection type: Provisioning Discovery and authentication type: PIN or PBC (step S221). When the WFD connection processing unit 212 of the communication terminal 210 receives the connection request, the WFD connection processing unit 212 performs Provisioning Discovery processing (step S222), WPS Provisioning Phase 1 processing (step S223), and WPS Provisioning Phase 2 processing (step S224) sequentially, with the other node (GO) which is a connection counterpart. Then, upon completion of the series of processing, the WFD connection processing unit 212 issues a notification of connection completion to the user control unit 213 (step S225), and ends the processing of connection to the existing GO.

Figure 14:
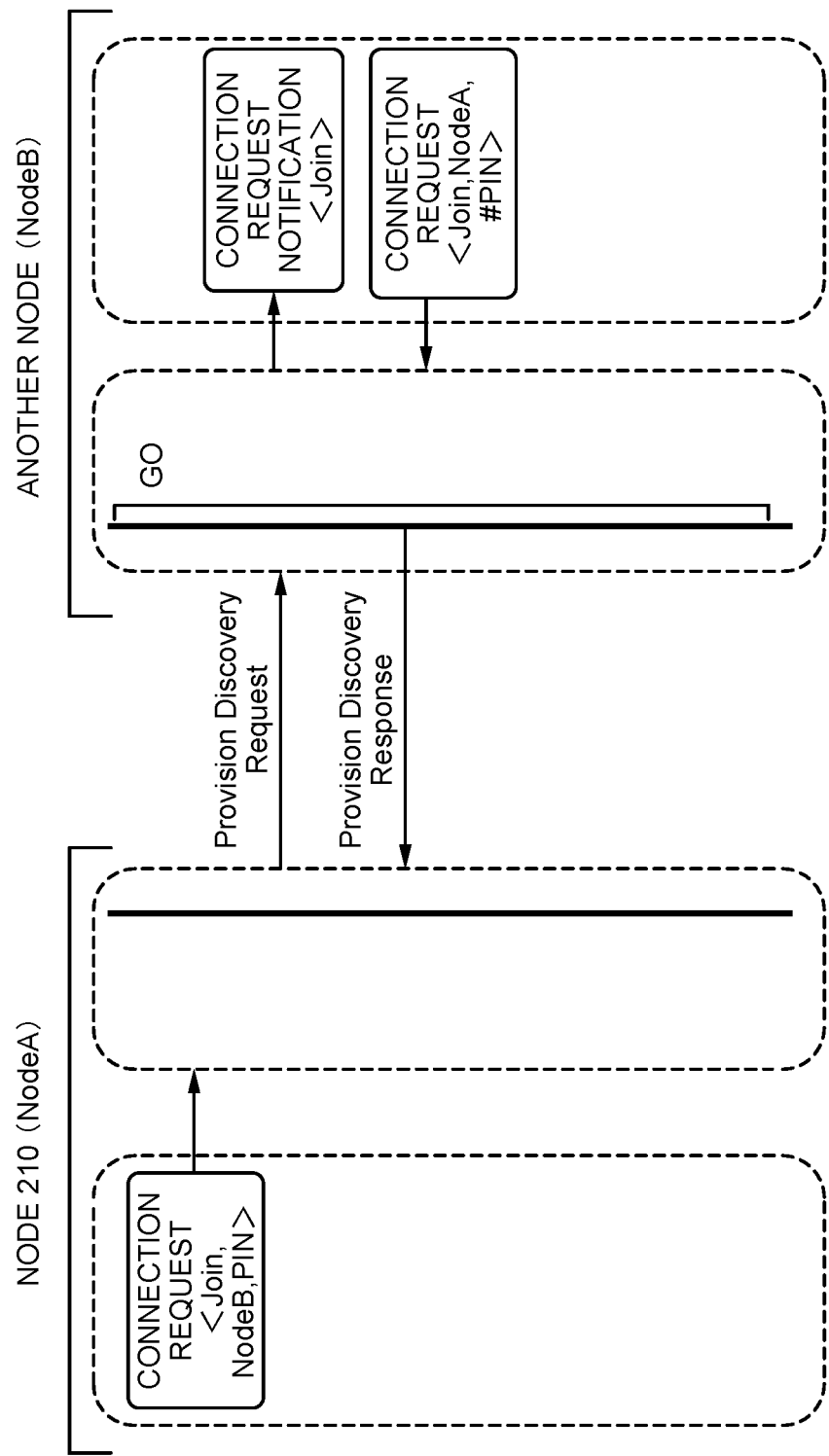
FIG. 14 is a diagram showing the outline of Provision Discovery performed by a communication terminal, according to the second exemplary embodiment of the present invention, with another communication terminal.

In the Provisioning Discovery processing at step S222, as shown in FIG. 14, Provision Discovery Request and Provision Discovery Response are transmitted and received between the communication terminal 210 and the existing GO which is a connection counterpart.

Figure 15:
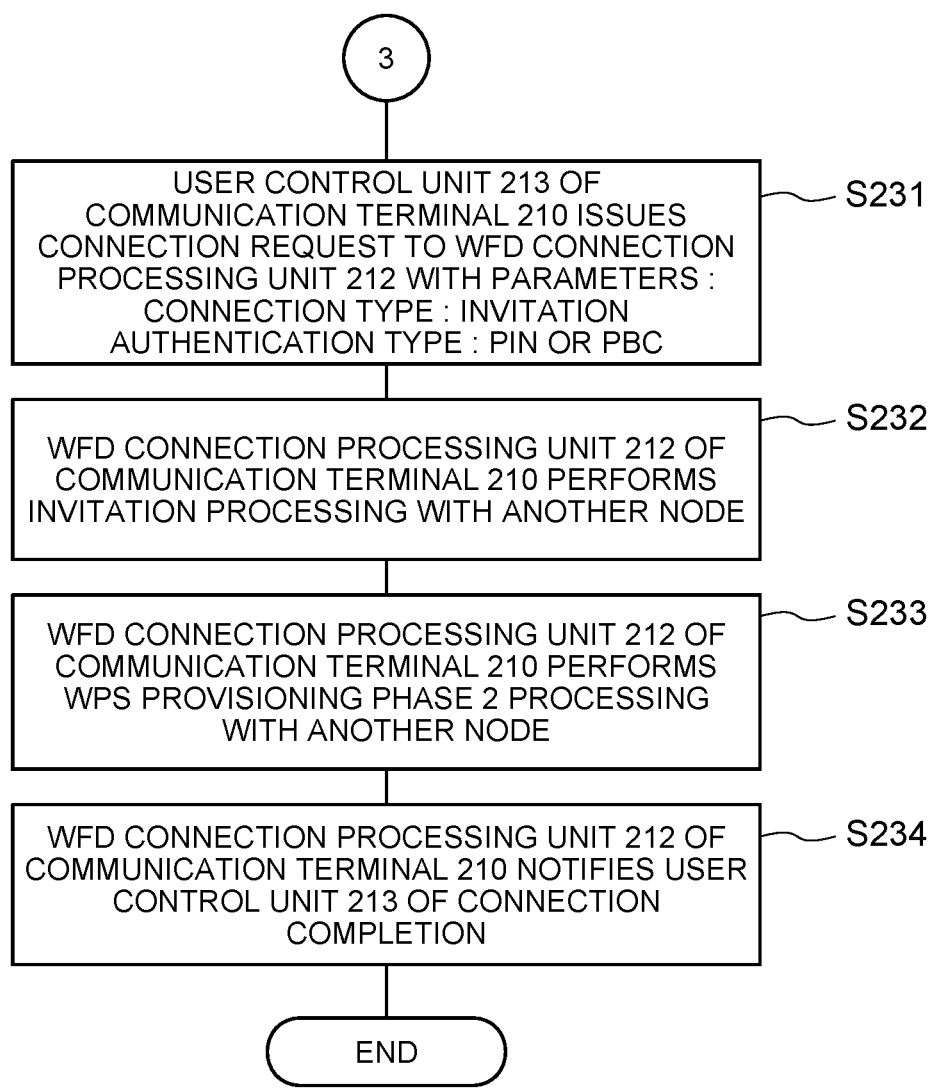
FIG. 15 is a flowchart showing still another exemplary procedure of connecting a communication terminal, according to the second exemplary embodiment of the present invention, to another communication terminal.

FIG. 15 shows the outline of processing performed until the communication terminal 210 connects to a node which belongs to the same persistent group as that of the own communication terminal and is capable of hosting it. First, the user control unit 213 of the communication terminal 210 issues a connection request to the WFD connection processing unit 212 with parameters of connection type: Invitation and authentication type: PIN or PBC (step S221). When the WFD connection processing unit 212 of the communication terminal 210 receives the connection request, the WFD connection processing unit 212 performs Invitation processing (step S232) and WPS Provisioning Phase 2 processing (step S233) sequentially, with the other node which is a connection counterpart. Then, upon completion of the series of processing, the WFD connection processing unit 212 issues a notice of connection completion to the user control unit 213 (step S225), and ends the processing of connection to the node capable of hosting the persistent group. As is obvious from comparison among FIG. 15, FIG. 9, and FIG. 13, if the connection counterpart is a node capable of hosting the persistent group, the WPS Provisioning Phase 1 processing is unnecessary, whereby the time required for completing the connection can be reduced.

Figure 16:
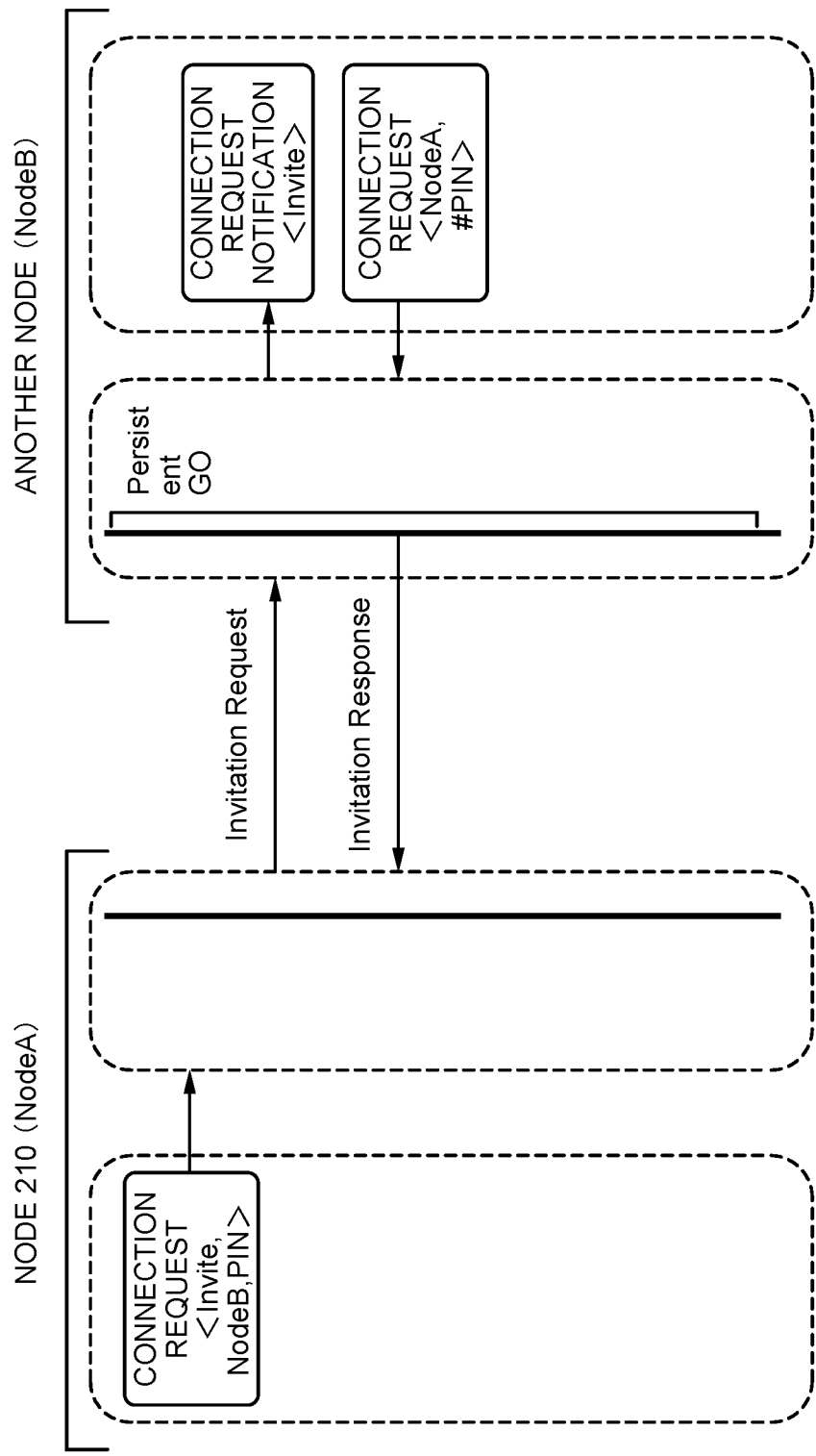
FIG. 16 is a diagram showing the outline of Invitation performed by a communication terminal, according to the second exemplary embodiment of the present invention, with another communication terminal.

In the Invitation processing at step S232, as shown in FIG. 16, Invitation Request and Invitation Response are transmitted and received between the communication terminal 210 and the node capable of hosting the persistent group which is a connection counterpart.

According to the present embodiment, it is possible to automatically connect the communication terminal 210, unconnected with a communication network, to another communication terminal. This is because the communication terminal 210 determines one communication terminal, to be a communication counterpart, from one or more communication terminals based on information included in the communication messages received from the one or more communication terminals found through the search, and forms a network with the connection counterpart.

Further, according to the present embodiment, it is possible to prevent the communication terminal 210 attempting to promptly connect to another communication terminal from failing it. This is because if there is a communication terminal belonging to the same persistent group as that of the own communication terminal and capable of hosting the persistent group in one or more communication terminals found, the communication terminal 210 determines the communication terminal capable of hosting the persistent group to be a connection counterpart.

Further, according to the present embodiment, it is possible to prevent the communication terminal 210 attempting to form a network having a larger number of communication terminals from failing it. This is because if there is GO in one or more communication terminals found, the communication terminal 210 determines the GO to be a connection counterpart.

Further, according to the present embodiment, automatic connection can be performed using either one of two authentication mechanisms namely PIN and PBC. This is because the communication terminal 210 operates to select an authentication mechanism required by the connection counterpart from the two authentication mechanisms namely PIN and PBC, and as a PIN number, a value having been set between a plurality of communication terminals is used.

Third Exemplary Embodiment

Figure 17:
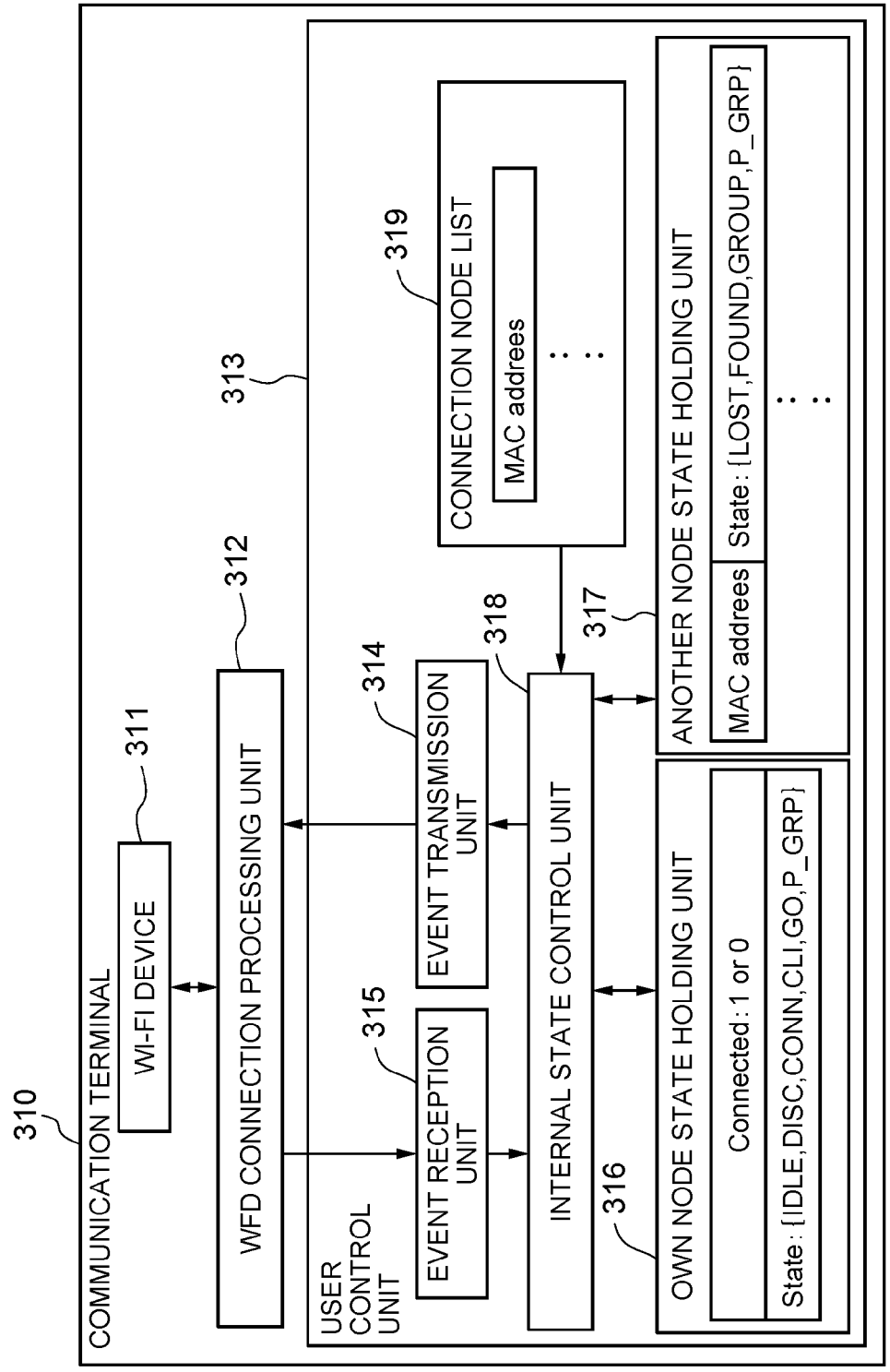
FIG. 17 is a block diagram of a communication terminal according to a third exemplary embodiment of the present invention.

Referring to FIG. 17, a communication terminal (node) 310 according to a third exemplary embodiment of the present invention includes a Wi-Fi device 311, a WFD connection processing unit 312, and a user control unit 313. The Wi-Fi device 311 and the WFD connection processing unit 312 are the same as the Wi-Fi device 211 and the WFD connection processing unit 212 of the communication terminal 210 according to the second exemplary embodiment shown in FIG. 3. The user control unit 313 includes an event transmission unit 314, an event reception unit 315, an own node state holding unit 316, an another node state holding unit 317, an internal state control unit 318, and a connection node list 319. Those other than the connection node list 319 are the same as the event transmission unit 214, the event reception unit 215, the own node state holding unit 216, the another node state holding unit 217, and the internal state control unit 218 of the communication terminal 210 according to the second exemplary embodiment shown in FIG. 3.

The connection node list 319 is a list of communication addresses (MAC addresses, for example) in which connection is allowed. If a communication address of a found communication terminal is not described in the connection node list 319, the communication terminal 310 does not connect to such a communication terminal. The connection node lists 319 have the same contents in all communication terminals in which connection is allowed. This means that in the connection node list 319 stored in the communication terminal 310, communication addresses of other communication terminals in which connection is allowed and the communication address of the own communication terminal 310 may be described. Further, the order of the communication addresses and the indexes attached thereto described in the connection node lists 319 which are stored in all communication terminals may be the same.

Operation of the communication terminal 310 according to the present embodiment is the same as the operation of the communication terminal 210 according to the second exemplary embodiment shown in FIG. 3 except for Device Discovery.

Figure 18:
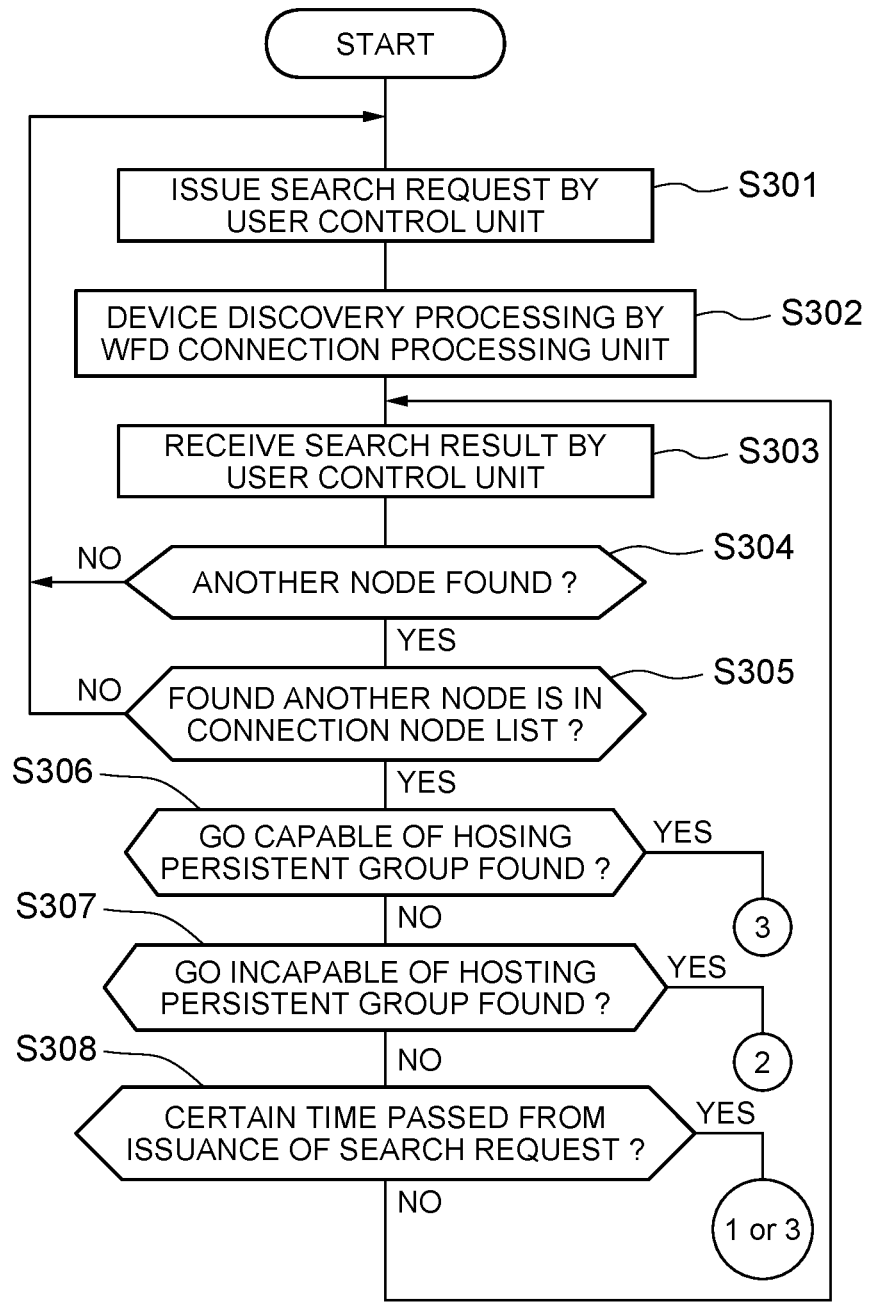
FIG. 18 is a flowchart showing details of Device Discovery performed by a communication terminal according to the third exemplary embodiment of the present invention.

FIG. 18 is a flowchart showing the details of the procedure of Device Discovery in the present embodiment. The user control unit 313 of the communication terminal 310 issues a search request to the WFD connection processing unit 312 (step S301), and the WFD connection processing unit 312 performs Device Discovery processing (step S302). When the user control unit 313 of the communication terminal 310 receives a search result from the WFD connection processing unit 312 (step S303), the user control unit 313 analyzes the search result and determines whether or not another node is found (step S304). If another node is not found, the user control unit 313 issues a search request again to the WFD connection control unit 312 (step S301). The loop of steps S301 to S304 is repeated until another node is found. The processing up to this point is the same as the processing of steps S201 to S204 in the second exemplary embodiment shown in FIG. 5.

When another node is found, the user control unit 313 of the communication terminal 310 determines whether or not the MAC address of the found node, included in the Prove Response received from the found node, is described in the connection node list 319 (step S305). If the MAC address of the found node is not described in the connection node list 319, the user control unit 313 issues a search request again to the WFD connection control unit 312 (step S301). The loop of steps S301 to S305 is repeated until another node, in which the MAC address thereof is described in the connection node list 319, is found.

When another node, in which the MAC address thereof is described in the connection node list 319, is found, the user control unit 313 of the communication terminal 310 analyzes the information of the node included in the Prove Response received from the found node, and determines whether or not GO capable of hosting the persistent group is found (step S306). If it is found, the user control unit 313 proceeds to processing to connect to the found GO capable of hosting the persistent group. Meanwhile, if GO capable of hosting the persistent group is not found, the user control unit 313 determines whether or not GO incapable of hosting the persistent group is found (step S307). If neither GO capable of hosting the persistent group nor GO incapable of hosting the persistent group is found, and an unconnected node is found, the user control unit 313 determines whether or not a certain period of time has passed from the time when the search request was issued (step S308). If a certain period of time has not passed, the user control unit 313 returns to step S303 and waits for reception of a search result, while if a certain period of time has passed, the user control unit 313 proceeds to processing of connecting to the found node in an unconnected state. Connection is made preferentially to a node having a bit capable of hosting the persistent group, that is, a node capable of hosting the persistent group, among the unconnected nodes found.

As described above, according to the present embodiment, it is possible to prevent the communication terminal 310 attempting to connect to a given communication terminal from failing it. This is because if there is no communication terminal in which the communication address thereof is described in the connection node list, in the one or more communication terminals found, the communication terminal 310 does not determine such a found communication terminal to be a connection counterpart.

It should be noted that the connection node list 319 may be used to determine a group owner at the time of forming a group by unconnected adjacent communication terminals, besides using it for selecting a connection counterpart. Specifically, in the GO Negotiation processing shown in FIG. 10, it is possible to determine a communication terminal in which the listing order of the MAC address is higher or in which the index is smaller, in the connection node list 319, to be a group owner.

Fourth Exemplary Embodiment

Figure 19:
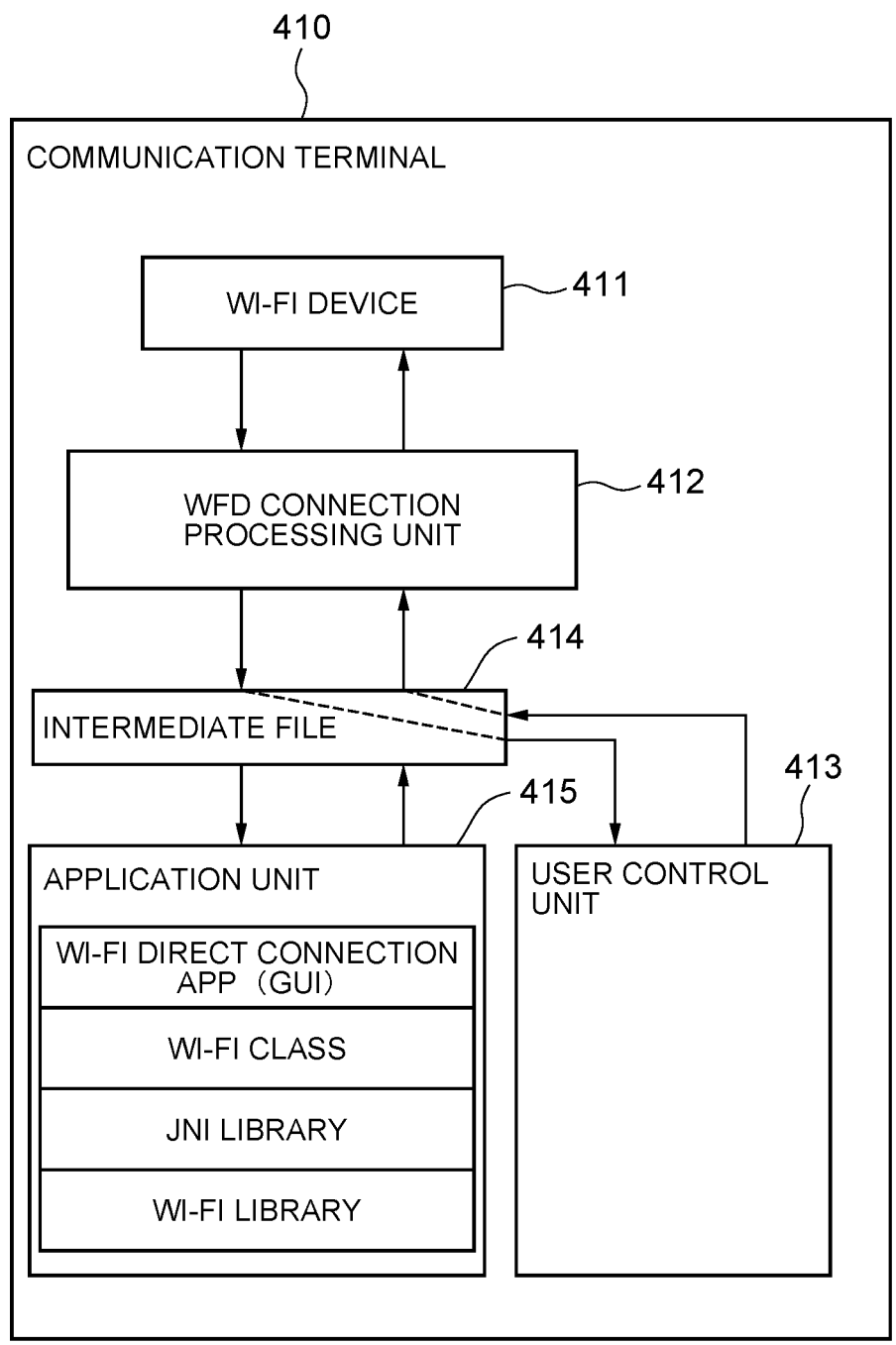
FIG. 19 is a block diagram of a communication terminal according to a fourth exemplary embodiment of the present invention.

Referring to FIG. 19, a communication terminal 410 according to a fourth exemplary embodiment of the present invention includes a Wi-Fi device 411, a WFD connection processing unit 412, a user control unit 413, an intermediate file 414, and an application unit 415.

The Wi-Fi device 411 and the WFD connection processing unit 412 have the same functions as those of the Wi-Fi device 211 and the WFD connection processing unit 212 of the communication terminal 210 according to the second exemplary embodiment shown in FIG. 3. Further, the user control unit 413 has the same function as that of the user control unit 213 of the communication terminal 210 according to the second exemplary embodiment shown in FIG. 3 or that of the user control unit 313 of the communication terminal 310 according to the third exemplary embodiment shown in FIG. 17.

The intermediate file 414 is used for communication between the WFD connection processing unit 412 and the application unit 415. This means that the WFD connection processing unit 412 is connected to the application unit 415 via the intermediate file 414.

The application unit 415 includes Wi-Fi Direct connection APP (Application Software) (GUI), a Wi-Fi class, a JNI (Java Native Interface) library, and a WiFi library. The application unit 415 notifies the WFD connection processing unit 412, via the intermediate file 414, of a command input from a user through an input device not shown, receives an execution result of the command from the WFD connection processing unit 412 via the intermediate file 414, and displays it on a display screen not shown. Thereby, the application unit 415 realizes a manual operation of the communication terminal 410 by the user.

The user control unit 413 intercepts communication from the WFD connection processing unit 412 to the application unit 415 by the intermediate file 414. Further, the user control unit 413 spoofs the application unit 415 and transmits a command to the WFD connection processing unit 412 via the intermediate file 414. Thereby, the user control unit 413 realizes automatic connection of the communication terminal 410.

In the case where the communication terminal 410 conforms to Linux/Android, the Wi-Fi device 411 may be realized by wlan0, the Wi-Fi connection processing unit 412 may be realized by wpa_supplicant, the intermediate file 414 may be realized by UNIX Domain Socket (/var/run/wpa_supplicant/wlan0, for example).

According to the present embodiment, as the user control unit 413 has a configuration of intercepting the intermediate file 414 used for communication between the Wi-Fi connection processing unit 412 and the application unit 415 and allowing a command to interrupt, it is possible to realize automatic connection of Wi-Fi Direct without altering the existing application.

Fifth Exemplary Embodiment

Figure 20:
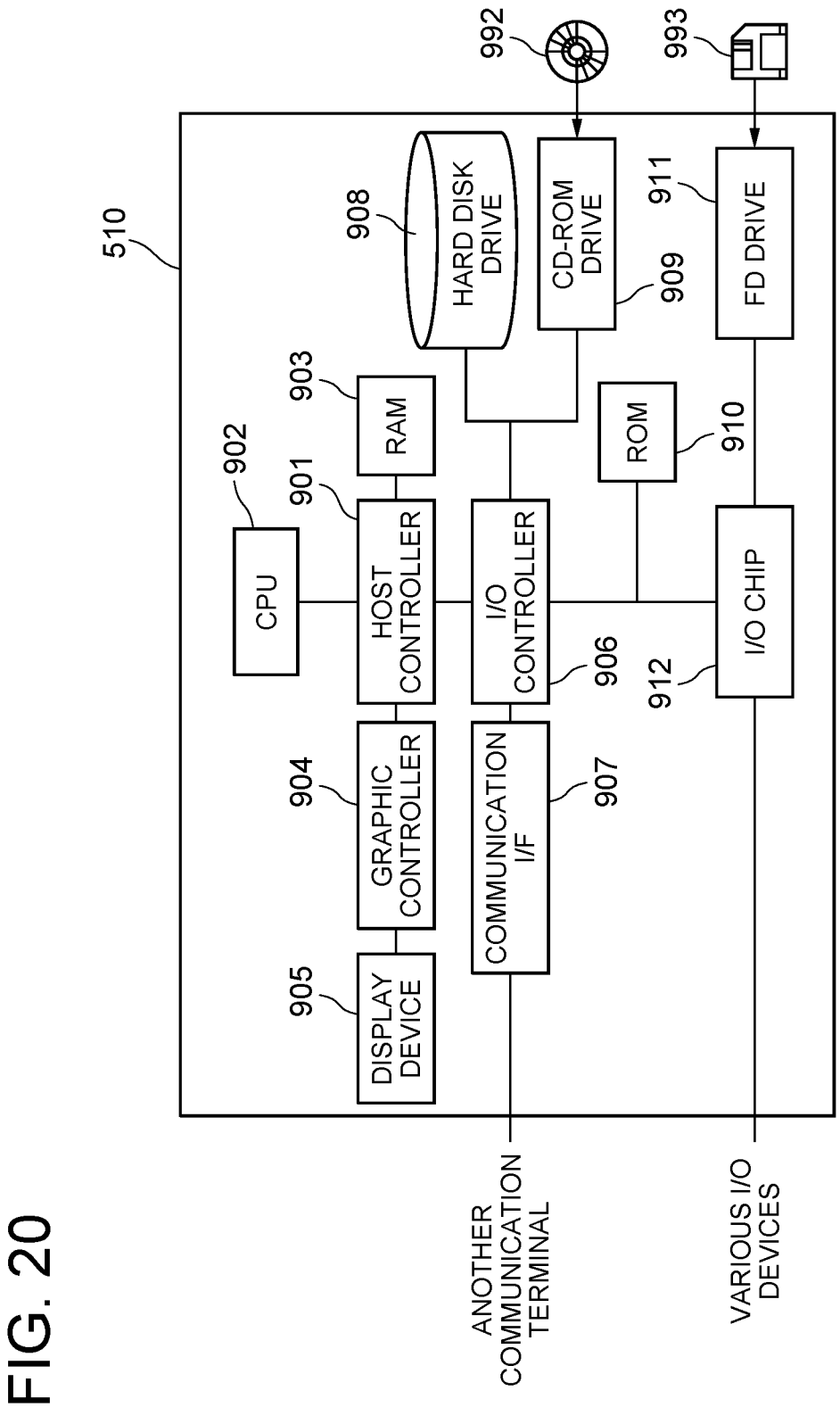
FIG. 20 is a block diagram of a communication terminal according to a fifth exemplary embodiment of the present invention.

FIG. 20 shows an example of a hardware configuration in which a communication terminal in each of the exemplary embodiments is configured of an electronic information processing device such as a computer. A communication terminal 510 of this example includes a CPU (Central Processing Unit) peripheral unit, an input/output unit, and a legacy input/output unit. The CPU peripheral unit includes a CPU 902, a RAM 903, a graphic controller 904, and a display device 905, which are interconnected by a host controller 901. The input/output unit includes a communication interface (I/F) 907, a hard disk drive 908, and a CD-ROM (Compact Disk Read Only Memory) drive 909, which are connected to the host controller 901 by an input/output (I/O) controller 906. The legacy input/output unit includes a ROM (Read Only Memory) 910, a flexible disk (FD) drive 911, and an input/output (I/O) chip 912, which are connected to the input/output controller 906.

The host controller 901 connects the RAM 903, and the CPU 902 accessing the RAM 903 at a high transfer rate and the graphic controller 904. The CPU 902 operates based on a program stored in the ROM 910 and the RAM 903 to control the respective units. The graphic controller 904 acquires image data generated on a frame buffer provided in the RAM 903 by the CPU 902 or the like, and displays it on the display device 905. Instead, the graphic controller 904 may have a frame buffer therein for storing image data generated by the CPU 902 or the like.

The input/output controller 906 connects the host controller 901, and the hard disk drive 908 which is a relatively high-speed input/output device, the communication interface 907, and the CD-ROM drive 909. The hard disk drive 908 stores a program used by the CPU 902 and data. The communication interface 907 connects to another communication terminal, and transmits and receives a program or data. The CD-ROM drive 909 reads a program or data from the CD-ROM 992, and supplies it to the hard disk drive 908 via the RAM 903 and to the communication interface 907.

The input/output controller 906 is connected with the ROM 910, the flexible disk drive 911, and relatively low-speed input/output devices of the the input/output chip 912. The ROM 910 stores a boot program executed at the time of booting by the communication terminal 510, a program depending on hardware of the communication terminal 510, or the like. The flexible disk drive 911 reads a program or data from the flexible disk 993, and supplies it to the hard disk drive 908 and the communication interface 907 via the RAM 903. The input/output chip 912 connects respective types of input/output devices via the flexible disk drive 911 or a parallel port, a serial port, a keyboard port, a mouse port, or the like.

A program executed by the CPU 902 is stored on a recording medium such as the flexible disk 993, the CD-ROM 992, an IC (Integrated Circuit) card or the like, and is supplied by a user. A program stored on the recording medium may be compressed or uncompressed. A program is installed from the recording medium to the hard disk drive 908, is read by the RAM 903, and is executed by the CPU 902. The program executed by the CPU 902 allows the communication terminal 510 to function as the wireless communication unit, the control unit, the storage unit, the application unit, and the like in each of the exemplary embodiments described above.

The program described above may be stored on an external storage medium. As a storage medium, an optical recording medium such as a DVD (Digital Versatile Disk) or a PD (Phase Disk), a magneto-optical recording medium such as a MD (Minidisk), a tape medium, a semiconductor memory such as an IC card, or the like may be used, besides the flexible disk 993 or the CD-ROM 992. Further, as a recording medium, it is also possible to use a storage medium such as a hard disk or a RAM provided in a server system connected with a dedicated communication network or the Internet, to thereby provide an information sharing system as a program via a network.

Other Exemplary Embodiments

While the present invention has been described using some exemplary embodiments, the present invention is not limited to the exemplary embodiments described above, and various additions and changes can be made therein. For example, an exemplary embodiment described below is also included in the present invention.

A connection rule is stored in a storage unit of a communication terminal, and if another communication terminal is found, a control unit of a communication terminal in an unconnected state determines a communication terminal to be used as a connection counterpart, according to the connection rule. The connection rule may be a rule that connection is made preferentially to an unconnected terminal than GO, for example, or a rule that in the case of connecting to a constructed group, connection is made to a client rather than GO even if GO is found.

As a method of finding, by a control unit of a communication terminal in an unconnected state, another communication terminal capable of hosting a persistent group with the own communication terminal, besides the method of checking the Persistent P2P Group bit or the Persistent Reconnect bit, it is possible to use a method of storing communication addresses (MAC addresses, for example) of the own communication terminal and another communication terminal capable of hosting a persistent group in the storage unit of the own communication terminal, and checking whether or not the communication address of the other communication terminal found is described in the list.

The present invention is based upon and claims the benefit of priority from Japanese patent application No. 2013-143765, filed on Jul. 9, 2013, the disclosure of which is incorporated herein in its entirety by reference.

INDUSTRIAL APPLICABILITY

The present invention is applicable to a method of automatically configuring a communication network, in particular, a communication network in which one communication terminal of a plurality of communication terminals functions as a master having a function of an access point, and the rest of the communication terminals function as slaves of the master.

REFERENCE NUMERALS 110 communication terminal
111 wireless communication unit
112 control unit
113 application unit
114 storage unit
115 antenna

The invention claimed is:

1. A network configuration method performed by a first communication terminal, the method comprising:
storing a list of acceptable communication addresses of communication terminals before searching for a second communication terminal;
transmitting a communication message searching for the second communication terminal and receiving a response of the communication message from the second communication terminal;
collating a communication address of the second communication terminal included in the response with the communication address in the list;
determining the second communication terminal which has its communication address on the list as a connection counterpart; and
configuring a communication network with the determined connection counterpart,
wherein the method further comprises:
storing a plurality of terminal states and an order of priority of the terminal states;
determining a terminal state of the second communication terminal based on the information included in the response; and
determining one second communication terminal having a terminal state of higher priority to be the connection counterpart among the second communication terminals that have a communication address being on the list,
wherein the terminal states include a first state of being unconnected with the communication network, and a second state of being connected with the communication network and functioning as a master having an access point function, and the second state has higher priority than the first state, and
wherein the determining of the terminal state of the second communication terminal includes, when the communication message is a Probe Response, determining whether or not the second communication terminal is connected with the communication network based on whether or not a P2P Group Info attribute is included in the Probe Response, and determining whether or not the second communication terminal is a master based on whether or not a P2P Group Owner bit in a Group Capability Bitmap, included in a P2P Capability field in the Probe Response, is equal to 1.

2. The network configuration method according to claim 1, wherein
in the configuring, performing a connection procedure according to a terminal state of the second communication terminal determined to be the connection counterpart.

3. A network configuration method by a first communication terminal, the method comprising:
storing a list of acceptable communication addresses of communication terminals before searching for a second communication terminal;
transmitting a communication message searching for the second communication terminal and receiving a response of the communication message from the second communication terminal;
collating a communication address of the second communication terminal included in the response with the communication address in the list;
determining the second communication terminal which has its communication address on the list as a connection counterpart; and
configuring a communication network with the determined connection counterpart,
wherein the method further comprises:
storing a plurality of terminal states and an order of priority of the terminal states;
determining a terminal state of the second communication terminal based on the information included in the response; and determining one second communication terminal having a terminal state of higher priority to be the connection counterpart among the second communication terminals that have a communication address being on the list, wherein the terminal states include a first state of being unconnected with the communication network and being incapable of hosting a persistent group, a second state of being unconnected with the communication network and being capable of hosting the persistent group, a third state of being connected with the communication network as a master having an access point function and being incapable of hosting the persistent group, and a fourth state of being connected with the communication network and being capable of hosting the persistent group, wherein a descending order of the priority is the fourth state, the third state, the second state, and the first state, and wherein the determining of the terminal state of the second communication terminal includes, when the communication message is a Probe Response, determining whether or not the second communication terminal is connected with the communication network based on whether or not a P2P Group Info attribute is included in the Probe Response, determining whether or not the second communication terminal is a master based on whether or not a P2P Group Owner bit in a Group Capability Bitmap, included in a P2P Capability field in the Probe Response, is 1, and determining whether or not the second communication terminal is capable of hosting a persistent group based on whether or not a Persistent P2P Group bit or a Persistent Reconnect bit in the Group Capability Bitmap is 1.

4. The network configuration method according to claim 3, wherein
in the configuring, performing a connection procedure according to a terminal state of the second communication terminal determined to be the connection counterpart.

5. A communication terminal that is a first communication terminal constituting a communication network, the communication terminal comprising:
a first storage unit configured to store a list of acceptable communication addresses of communication terminals before searching for a second communication terminal;
a wireless communication unit configured to transmit and receive a communication message; and
a control unit connected with the wireless communication unit, wherein
the control unit is configured to transmit the communication message for searching for the second communication terminal, receive a response of the communication message from the second communication terminal, collate a communication address of the second communication terminal included in the response with the communication address in the list, determine the second communication terminal which has its communication address on the list as a connection counterpart, and configure the network with the determined connection counterpart,
the communication terminal further comprising:
a second storage unit configured to store a plurality of terminal states and an order of priority of the terminal states, wherein
the control unit is configured determine a terminal state of the second communication terminal based on the information included in the response, and determine one second communication terminal having a terminal state of higher priority to be the connection counterpart among the second communication terminals that have a communication address thereof being on the list, wherein the second storage unit is configured to store a first state of being unconnected with the communication network, and a second state of being connected with the communication network and functioning as a master having an access point function, and the second state has higher priority than the first state, wherein the determining of the terminal state of the second communication terminal includes, when the communication message is a Probe Response, determining whether or not the second communication terminal is connected with the communication network based on whether or not a P2P Group Info attribute is included in the Probe Response, and determining whether or not the second communication terminal is a master based on whether or not a P2P Group Owner bit in a Group Capability Bitmap, included in a P2P Capability field in the Probe Response, is equal to 1.

6. The communication terminal according to claim 5, wherein
in the network configuration, the control unit is configured to perform a connection procedure according to a state of the second communication terminal determined to be the connection counterpart.

7. The communication terminal according to claim 5, wherein
the wireless communication unit includes a device driver, and
the control unit includes:
a connection control unit configured connect to the device driver; and
a user control unit configured to connect to an intermediate file of a UNIX domain socket used for communication between an application unit that controls a graphical user interface and the connection control unit, intercept communication from the connection control unit to the application unit via the intermediate file, and spoof the application unit to thereby transmit a command to a connection control unit via the intermediate file.

8. A communication terminal that is a first communication terminal constituting a communication network, the communication terminal comprising:
a first storage unit configured to store a list of acceptable communication addresses of communication terminals before searching for a second communication terminal;
a wireless communication unit configured to transmit and receive a communication message; and
a control unit connected with the wireless communication unit, wherein
the control unit configured to transmit the communication message for searching the second communication terminal, receive a response of the communication message from the second communication terminal, collate a communication address of the second communication terminal included in the response with the communication address in the list, determine the second communication terminal in which the communication address thereof being on the list as a connection counterpart, and configure the network with the determined connection counterpart, wherein the communication terminal further comprises:
a second storage unit configured to store a plurality of terminal states and an order of priority of the terminal states, wherein
the control unit is configured determine a terminal state of the second communication terminal based on the information included in the response, and determine one second communication terminal having a terminal state of higher priority to be the connection counterpart among the second communication terminals that have a communication address being on the list,
wherein the second storage unit is configured to store a first state of being unconnected with the communication network and being incapable of hosting a persistent group, a second state of being unconnected with the communication network and being capable of hosting the persistent group, a third state of being connected with the communication network as a master having an access point function and being incapable of hosting the persistent group, and a fourth state of being connected with the communication network as the master and being capable of hosting the persistent group,
wherein a descending order of the priority is the fourth state, the third state, the second state, and the first state, and
wherein the determining of the terminal state of the second communication terminal includes, when the communication message is a Probe Response, determining whether or not the second communication terminal is connected with the communication network based on whether or not a P2P Group Info attribute is included in the Probe Response, determining whether or not the second communication terminal is a master based on whether or not a P2P Group Owner bit in a Group Capability Bitmap, included in a P2P Capability field in the Probe Response, is 1, and determining whether or not the second communication terminal is capable of hosting a persistent group based on whether or not a Persistent P2P Group bit or a Persistent Reconnect bit in the Group Capability Bitmap is 1.

9. The communication terminal according to claim 8, wherein
in the network configuration, the control unit is configured to perform a connection procedure according to a state of the second communication terminal determined to be the connection counterpart.

10. The communication terminal according to claim 8, wherein
the wireless communication unit includes a device driver, and
the control unit includes:
a connection control unit configured connect to the device driver; and
a user control unit configured to connect to an intermediate file of a UNIX domain socket used for communication between an application unit that controls a graphical user interface and the connection control unit, intercept communication from the connection control unit to the application unit via the intermediate file, and spoof the application unit to thereby transmit a command to a connection control unit via the intermediate file.

11. A non-transitory computer readable medium storing a program comprising instructions for causing a computer, held by a first communication terminal constituting a communication network, to function as:

a first storage unit configured to store a list of acceptable communication addresses of communication terminals before searching for a second communication terminal;
a wireless communication unit configured to transmit and receive a communication message; and
a control unit connected with the wireless communication unit, wherein
the control unit configured to transmit the communication message for searching the second communication terminal, receive a response of the communication message from the second communication terminal, collate a communication address of the second communication terminal included in the response with the communication address in the list, determine the second communication terminal which has its communication address on the list as a connection counterpart, and configure the network with the determined connection counterpart,
the control unit further configured to:
store a plurality of terminal states and an order of priority of the terminal states;
determine a terminal state of the second communication terminal based on the information included in the response; and
determine one second communication terminal having a terminal state of higher priority to be the connection counterpart among the second communication terminals that have a communication address being on the list,
wherein the terminal states include a first state of being unconnected with the communication network, and a second state of being connected with the communication network and functioning as a master having an access point function,
wherein the second state has higher priority than the first state, and
wherein the determining of the terminal state of the second communication terminal includes, when the communication message is a Probe Response, determining whether or not the second communication terminal is connected with the communication network based on whether or not a P2P Group Info attribute is included in the Probe Response, and determining whether or not the second communication terminal is a master based on whether or not a P2P Group Owner bit in a Group Capability Bitmap, included in a P2P Capability field in the Probe Response, is equal to 1.

12. A non-transitory computer readable medium storing a program comprising instructions for causing a computer, held by a first communication terminal constituting a communication network, to function as:
a first storage unit configured to store a list of acceptable communication addresses of communication terminals before searching for a second communication terminal;
a wireless communication unit configured to transmit and receive a communication message; and
a control unit connected with the wireless communication unit, wherein
the control unit is configured to transmit the communication message for searching the second communication terminal, receive a response of the communication message from the second communication terminal, collate a communication address of the second communication terminal included in the response with the communication address in the list, determine the second communication terminal which has its communication address on the list as a connection counterpart, and configure the network with the determined connection counterpart, wherein the control unit is further configured to:

store a plurality of terminal states and an order of priority of the terminal states;

determine a terminal state of the second communication terminal based on the information included in the response; and determine one second communication terminal having a terminal state of higher priority to be the connection counterpart among the second communication terminals which have a communication address being on the list, wherein the terminal states include a first state of being unconnected with the communication network and being incapable of hosting a persistent group, a second state of being unconnected with the communication network and being capable of hosting the persistent group, a third state of being connected with the communication network as a master having a an access point function and being incapable of hosting the persistent group, and a fourth state of being connected with the communication network and being capable of hosting the persistent group, wherein a descending order of the priority is the fourth state, the third state, the second state, and the first state, and wherein the determining of the terminal state of the second communication terminal includes, when the communication message is a Probe Response, determining whether or not the second communication terminal is connected with the communication network based on whether or not a P2P Group Info attribute is included in the Probe Response, determining whether or not the second communication terminal is a master based on whether or not a P2P Group Owner bit in a Group Capability Bitmap, included in a P2P Capability field in the Probe Response, is 1, and determining whether or not the second communication terminal is capable of hosting a persistent group based on whether or not a Persistent P2P Group bit or a Persistent Reconnect bit in the Group Capability Bitmap is 1.

* * * * *